United States Patent [19]
Takahashi et al.

[11] Patent Number: 6,024,431
[45] Date of Patent: *Feb. 15, 2000

[54] IMAGE OUTPUT APPARATUS, IMAGE OUTPUT METHOD, INK JET PRINT METHOD AND PRINTED PRODUCT OBTAINED WITH SAID METHOD

[75] Inventors: Kazuyoshi Takahashi, Kawasaki; Shoji Koike; Takashi Watanabe, both of Yokohama; Hiroshi Endo, Sagamihara; Toshiyuki Yanaka, Tokyo; Masatoshi Ikkatai, Yokohama; Yasushi Miura, Kawasaki; Yasuyuki Takanaka; Eiichi Takagi, both of Yokohama; Yoshiko Miyashita, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/711,007

[22] Filed: Sep. 11, 1996

Related U.S. Application Data

[63] Continuation of application No. 08/160,207, Dec. 2, 1993, abandoned.

[30] Foreign Application Priority Data

| Dec. 3, 1992 | [JP] | Japan | 4-324422 |
| Dec. 28, 1992 | [JP] | Japan | 4-347434 |
| Mar. 1, 1993 | [JP] | Japan | 5-040187 |
| Jun. 11, 1993 | [JP] | Japan | 5-140927 |
| Jul. 26, 1993 | [JP] | Japan | 5-183962 |

[51] Int. Cl.$^7$ .................................. B41J 2/21
[52] U.S. Cl. .................. 347/19; 347/37; 347/24; 347/43; 347/49; 347/106
[58] Field of Search .................. 347/37, 43, 24, 347/19, 49, 106

[56] References Cited

U.S. PATENT DOCUMENTS

| 4,313,124 | 1/1982 | Hara | 347/57 |
| 4,345,262 | 8/1982 | Shirato et al. | 347/57 |
| 4,459,600 | 7/1984 | Sato et al. | 347/56 |
| 4,463,359 | 7/1984 | Ayata et al. | 347/56 |
| 4,521,805 | 6/1985 | Ayata | 347/3 X |
| 4,528,576 | 7/1985 | Koumura | 347/43 X |
| 4,558,333 | 12/1985 | Sugitani et al. | 347/65 |

(List continued on next page.)

FOREIGN PATENT DOCUMENTS

| 0280458 | 8/1988 | European Pat. Off. | C09D 11/00 |
| 0315417 | 5/1989 | European Pat. Off. | B41J 3/04 |
| 0331481 | 9/1989 | European Pat. Off. | B41J 3/04 |
| 54-056847 | 5/1979 | Japan | B41M 5/26 |
| 59-123670 | 7/1984 | Japan | B41J 3/04 |
| 59-138461 | 8/1984 | Japan | B41J 3/04 |
| 60-071260 | 4/1985 | Japan | B41J 3/04 |

(List continued on next page.)

*Primary Examiner*—Joseph Hartary
*Attorney, Agent, or Firm*—Fitzpatrick, Cella, Harper & Scinto

[57] ABSTRACT

An apparatus for performing the printing by scanning a carriage having a plurality of print heads mounted in a predetermined direction relative to the printing medium, so that an image is formed to have a desired color tone and density without decreased throughput. Conversion data for reproducing the color tone and the scan range of the carriage are changed in accordance with the used heads among the mounted heads. Also, the replaceability can be enhanced and the longer life for each group is attained by grouping the heads mounted. Further, the scan range of recording and the scan range for the recovery can be changed by selecting the group for use in accordance with the recording mode. Also, in an ink jet printing apparatus having a longer print length, a printing method for effecting the stable recording is provided.

75 Claims, 18 Drawing Sheets

U.S. PATENT DOCUMENTS

| | | | |
|---|---|---|---|
| 4,608,577 | 8/1986 | Hori | 347/66 |
| 4,713,701 | 12/1987 | Kawamura | 347/2 X |
| 4,716,421 | 12/1987 | Ozawa et al. | 347/43 |
| 4,723,129 | 2/1988 | Endo et al. | 347/56 |
| 4,740,796 | 4/1988 | Endo et al. | 347/56 |
| 4,774,529 | 9/1988 | Paranjpe et al. | 347/43 |
| 4,797,687 | 1/1989 | Holder | 347/107 X |
| 4,872,027 | 10/1989 | Buskirk | 347/19 X |
| 4,969,951 | 11/1990 | Koike | 347/106 X |
| 5,009,626 | 4/1991 | Katz | 446/391 |
| 5,018,884 | 5/1991 | Hirano | 347/43 X |
| 5,235,351 | 8/1993 | Koizumi | 347/14 |

FOREIGN PATENT DOCUMENTS

| | | | |
|---|---|---|---|
| 61-179269 | 8/1986 | Japan | C09D 11/00 |
| 62-053492 | 3/1987 | Japan | D06P 5/22 |
| 62-057750 | 12/1987 | Japan | D06P 5/00 |
| 63-042873 | 2/1988 | Japan | B41J 3/04 |
| 63-145379 | 6/1988 | Japan | C09D 11/00 |
| 64-264853 | 10/1989 | Japan | B41J 3/04 |
| 2187343 | 7/1990 | Japan | B41J 2/045 |
| 2-200446 | 8/1990 | Japan | B41J 2/21 |
| 2-200447 | 8/1990 | Japan | B41J 2/21 |
| 2-204041 | 8/1990 | Japan | B41J 2/01 |
| 2-286350 | 11/1990 | Japan | B41J 2/21 |
| 3046589 | 7/1991 | Japan | D06P 5/00 |
| 4-202574 | 7/1992 | Japan | B41M 5/00 |
| 4-209867 | 7/1992 | Japan | D06B 11/00 |

FIG. 16

| | INK | 25°C VISCOSITY (cp) | SURFACE TENSION (dyne/cm) | CLOTH | RECORDING APPARATUS a. | | | | RECORDING APPARATUS b. | | | |
|---|---|---|---|---|---|---|---|---|---|---|---|---|
| | | | | | NUMBER OF TIMES WHERE NO INK IS DISCHARGED TIMES/30 SCANS | *1 AVERAGE LENGTH OF NO INK DISCHARGE (cm) | *2 BLUR | *3 HEAD ORIFICE SURFACE | NUMBER OF TIMES WHERE NO INK IS DISCHARGED TIMES/30 SCANS | *1 AVERAGE LENGTH OF NO INK DISCHARGE (cm) | *2 BLUR | *3 HEAD ORIFICE SURFACE |
| EXAMPLE | A | 3.3 | 43 | a. | 6 | 6.0 | △ | △ | 1 | 1.5 | △ | ○ |
| EXAMPLE | B | 3.7 | 50 | a. | 10 | 6.0 | ○ | △ | 0 | 0 | ○ | ○ |
| EXAMPLE | C | 3.3 | 38 | a. | 6 | 7.0 | △ | △ | 1 | 1.0 | △ | ○ |
| EXAMPLE | D | 3.7 | 52 | a. | 9 | 5.0 | ○ | △ | 0 | 0 | | ○ |
| COMPARATIVE EXAMPLE | E | 4.2 | 38 | a. | 20 | 15.0 | △ | × | 1 | 2.0 | △ | ○ |
| COMPARATIVE EXAMPLE | F | 1.4 | 58 | a. | 30 OR MORE | 18.0 | △ | × | 1 | 1.0 | △ | ○ |
| COMPARATIVE EXAMPLE | G | 3.7 | 33 | a. | 30 OR MORE | 20.0 | × | × | 2 | 1.5 | × | △ |
| COMPARATIVE EXAMPLE | H | 1.8 | 66 | a. | 30 OR MORE | 15.0 | △ | △ | 1 | 1.0 | △ | ○ |
| EXAMPLE | I | 2.8 | 59 | b. | 3 | 4.0 | ○ | ○ | 0 | 0 | ○ | ○ |
| EXAMPLE | J | 3.3 | 58 | b. | 5 | 4.5 | ○ | ○ | 0 | 0 | ○ | ○ |

IMAGE OUTPUT APPARATUS, IMAGE OUTPUT METHOD, INK JET PRINT METHOD AND PRINTED PRODUCT OBTAINED WITH SAID METHOD

This application is a continuation of application Ser. No. 08/160,207 filed Dec. 2, 1993, now abandoned.

BACKGROUND OF THE INVENTION

1. Field of the Invention

The present invention relates to a color image output apparatus and method for outputting a color image onto the printing medium by having the image data supplied, and in particular to an image output apparatus and method of the so-called serial scan type of outputting an image while scanning a print head along a predetermined direction relative to the printing medium.

Also, the invention relates to a method for effecting the print coloring on the cloths based on an ink jet system by the use of the heat energy.

2. Related Background Art

Color image output apparatuses for outputting a color image onto the printing medium with the image data supplied can perform the printing using print agents (color toner, color ink) of four colors of subtractive primary colors i.e., cyan (C), magenta (M) and yellow (Y) and black (Bk) to reproduce vividly three subtractive primary colors or black.

Also, image output apparatuses are in some cases desired to use other color print agents than the above colors of C, M, Y and Bk (hereinafter referred to as specializing color, e.g., metallic color or cobalt blue). This occurs when a color which is unable or difficult to represent with C, M, Y, Bk is required in the output image, or when the use of coloring agent such ink or toner is to be reduced.

In particular, in the fields of textile printing to be made on the cloths or gravure printing for posters, it is strongly demanded to reproduce faithfully the designs created by the designer, and therefore the use of print agents for specializing colors is desirable for the colors which can not be represented with C, M, Y, Bk.

On the other hand, it is often desired to have a higher print density or more print gradations.

Also, some images may be printed only using part of the print colors without requiring all the print colors.

In this way, along with the spread of image output apparatuses or extended application fields, various requirements for the image output apparatuses are raised, whereby it is strongly desired to provide image output apparatuses capable of minutely coping with such requirements, with less decreased throughput.

For example, when the higher print density is sought in the textile printing relying on the ink jet system, the inks for use with the textile printing have already high color densities, and still higher density will result in greater ink viscosities, whereby there is a risk that there occurs a trouble in the ink discharge. Also, if the optical density is to be increased by providing a greater dot diameter, the size or mass of ink droplet to be discharged may not become uniform, resulting in deviated shot positions, whereby there is a risk of producing streaks or unevenness in the connected portions of images, or producing white streaks in the portion on which even density should be expected. Further, apparatuses of scanning the print head across the same print surface multiple times to effect higher print density can not avoid the print speed decreasing.

Typical of the conventional coloring methods is a screen textile printing of using a silk screen plate to make the printing directly onto the cloths. The screen textile printing is a method in which for an original image to be printed, a silk screen plate is prepared for each color used in the original image, and the ink is directly transferred through silk meshes onto the cloths to effect the coloring.

However, such screen textile printing method has the problem associated therewith that many processes and days are required in fabricating screen plates, and the operations such as the proportion of color inks required for the printing, and the alignment of screen plates for color inks, are necessary. Moreover, the apparatus is large in size, and becomes larger in proportion to the number of used colors, requiring a larger installation space, and further the storage space for silk screen plates fabricated.

On the other hand, ink jet recording apparatuses have been put to practical use, which have the functions of a printer, a copying machine or a facsimile apparatus, or are useful as the output unit of a composite electronic equipment including a computer or a word processor, or a work station, and to solve the above problem, a number of recording methods have been proposed to employ such an ink jet recording apparatus for the color printing of discharging the ink directly onto the cloths.

With such methods, there is no need for plates used for the screen textile printing, so that the processes and days before the printing onto the cloths can be largely shortened, with the reduced size of apparatus. Naturally, since the image information for printing can be stored in a medium such as a tape, a floppy disk, or an optical disk, the excellent storage or preservation ability can be attained. Further, the change in coloration, layout change, enlargement or reduction of original image can be readily effected.

In particular, ink jet recording means (recording head) of discharging the ink by the use of heat energy can be easily fabricated having an arrangement of liquid channels (arrangement of discharge ports or orifices) with high density by having electricity-heat converters, electrodes, liquid channel walls and a ceiling plate formed as films on the substrate through the semiconductor fabrication processes including etching, vapor deposition and sputtering, thereby allowing for further compact constitution, higher recording speed and higher definition in image quality, and this method is expected as one of the coloring methods on the ink jet print system.

The inks for use with a special ink jet printing method such as textile printing are subjected to more severe requirements than with the conventional ink jet recording onto the recording medium such as paper, including:

Sufficient density for the coloring

No clogging in ink discharge orifices or ink channels of head

Less irregular blur on the cloth

No change in discharge characteristic despite durable uses over the long term, in particular, no deposition of foreign matters on the heater for applying the heat energy, or no heater breakage due to cavitation at the extinction of bubbles, in the type of discharging the ink by the use of heat energy. The inks which can meet the above requirements have been proposed in the inventions such as Japanese Patent Publication No. 62-57750 and Japanese Laid-Open Patent Application No. 61-179269.

However, in the state of the art, none of the ink jet printing methods have been known which can satisfy all these performances simultaneously, although partially meeting individual performances to some extent.

Further, a new problem as will be described later has arisen in attempting to put the ink jet printing method to practical use.

Among the apparatuses for use with the ink jet printing, a serial type apparatus relies on the serial scan method of scanning in a direction crosswise to the conveying direction (sub-scan direction) of the recording medium. With this apparatus, the printing of an entire image on the recording medium is achieved in such a way as to repeat the recording operation of printing one line of image by recording means mounted on the carriage movable in a scan direction over the recording medium, feeding the sheet (pitch convey) by a predetermined amount in a sub-scan direction after one line of recording, and then printing the next line of image onto the recording medium as positioned.

In order to put this ink jet printing apparatus to practical use for the color printing, the continuous print length (scan length) must be much longer (approximately 0.6 m or more) than with the normal ink jet recording apparatuses as the printers, owing to the requirements from the production speed or with the final products such as clothings. For this reason, in the ink jet printing method of discharging the ink from the head by the use of heat energy generated by heat generating elements of the head upon the application of a drive signal, the head temperature greatly rises, because of its scanning over the longer length to be performed at one time, whereby it is difficult to maintain a stable discharge during one time of scanning, owing to largely changing ink viscosity. As a result, the ink likely may not be discharged.

Further, the depositing amount of ink mist onto the head orifice face will be quite enormous, as may occur at the ink discharge due to the longer scanning for one time, causing a clogging of nozzle orifices which will lead to undischarge (wetting undischarge). Further, even the ink mist deposited in the neighborhood of nozzles is swept away over nozzle openings by contact with the fiber such as fluffs or waste threads present on the surface of cloths, causing a clogging of nozzle which will lead to undischarge of the ink. Also, there occurs a new problem that waste threads themselves as above described may clog any of the nozzle openings because there are more chances of making contact with and attaching onto the nozzle openings, thereby causing undischarge. This is a remarkable problem which may occur with the apparatuses having a longer print length, such as those of discharging the ink by the application of drive signals as many as $5 \times 10^3$ times or more in one scan through at least one of the nozzles of head.

If an image is able to be directly formed on the cloths by using the ink jet recording apparatus as above described, instead of the conventional textile printing method as previously described, the number of processes or days required for the image formation on the cloths can be greatly shortened without need of the screen plates, and the smaller apparatus can be fabricated. However, in the case of using the cloths as the recording medium, there is a problem that the coloring ability or image density may be degraded, unlike the case of recording onto the paper. Therefore, only the standard colors, normally consisting of four colors (cyan, magenta, yellow and black) for use with the full-color recording onto the paper, was difficult to cover a sufficient range of color reproduction in the case where the printing is made onto the cloths. Thus, a technique has been proposed in which other colors than the four standard colors are employed as specializing colors, such inks of specializing colors used together with the standard color inks.

However, when the specializing color inks are additionally used with the standard color inks, it is necessary to increase the number of recording heads depending on the kinds of used inks, thereby often resulting in too large a head holder for holding the recording heads. As a result, even when the recording heads for specializing colors are provided but are not used, it will take more time to effect the printing operation or recovery operation (wiping, idle discharge) which is intrinsic to the ink jet recording system, resulting in a problem of the substantial decreased recording speed.

SUMMARY OF THE INVENTION

The present invention has been achieved in view of the aforesaid problems, and resides in an image output apparatus, characterized by comprising a plurality of print heads for effecting the printing in corresponding colors respectively onto the printing medium, a carriage on which the plurality of print heads are mountable, scanning means for scanning the carriage relative to the printing medium to form an image by means of the plurality of print heads, and scan range changing means for changing the scan range with the scanning means in accordance with print heads for use in forming the image among the plurality of print heads mounted on the carriage.

Also, the present invention resides in an image output apparatus as described above, characterized by further comprising storage means for storing conversion data for representing print colors, the storage means provided corresponding to the plurality of print heads respectively, and conversion data changing means for changing the conversion data stored in said storage means.

Also, the present invention resides in an image output apparatus as described above, characterized in that the scan range changing means and/or the conversion data changing means change(s) the scan range and/or the conversion data in accordance with print colors corresponding to the print heads mounted on the carriage, the number of print heads mounted, and their mounted positions.

Also, the present invention resides in an image output method for forming an image on the printing medium while scanning a carriage having a plurality of print heads mounted relative to the printing medium, characterized by including a head detecting step for detecting print heads mounted on the carriage, and a scan range changing step for changing said scan range in accordance with the print heads mounted on the carriage.

Also, in the image output method of the present invention, the head detecting step is characterized by detecting print colors corresponding to the print heads mounted on the carriage, the number of print heads, and the positions of print heads mounted.

Also, the image output method of the present invention is characterized by further including a conversion data changing step for changing conversion data for representing color tones corresponding to the print colors in accordance with a detection of the head detecting step.

The present invention as described above is constituted in such a way that the heads for desired color inks are mountable by an appropriate number, and the contents of a table for expanding conversion data for reproducing color tones are rewritten in accordance with color tones of the heads mounted, or the scan range such as a print range, an idle discharge range or a wiping range, i.e., start position and stop position, is switched in accordance with the number or range of the heads mounted. With the above constitution, the objects of the present invention can be achieved. That is, it is possible to flexibly cope with the changes of color tones or the change of density or the preservation of density, and improve the throughput by achieving efficient processing in the above range or printing at high density.

Another object of the present invention is to provide an ink jet printing method for effecting the stable discharge without undischarge in the ink jet printing having a long print length, and which can provide an excellent dyed product or colored matter without image defect.

A further object of the present invention is to provide an ink jet printing method which can solve the problems of the coloration associated with the above-described ink jet printing method, that is, which can provide a colored matter of high density without blur, without causing a clogging of head, and is excellent in durability or discharge characteristic over the long term.

The above objects of the present invention can be accomplished as follows.

That is, the present invention is an ink jet printing method in which a recording head discharges the ink onto the printing medium by the use of the heat energy generated by heat generating elements of a recording head by the application of a drive signal, characterized in that the recording head scans relatively across the printing medium, wherein at least one of nozzles contained in the recording head discharges the ink by the application of drive signals as many as $10^4$ times or more during one scan, and wherein the ink contains a dye from 3.1 wt % to 30 wt % of all the ink, the viscosity being from 1.5 cP to 4 cP, and the surface tension being from 35 dyn/cm to 65 dyn/cm.

Further, the present invention provides a color ink jet printing method in which a recording head discharges the inks onto the printing medium by the use of the heat energy generated by heat generating elements of a recording head by the application of a drive signal, using the inks at least consisting of black, magenta, cyan and yellow, characterized in that the recording head scans relatively across the printing medium, wherein at least one of nozzles contained in the recording head discharges the ink by the application of drive signals as many as $10^4$ times or more during one scan, and wherein the ink contains a dye from 3.1 wt % to 30 wt % of all the ink, the viscosity being from 1.5 cP to 4 cP, and the surface tension being from 35 dyn/cm to 65 dyn/cm.

As a result of having examined the printing methods which can solve various problems as previously described simultaneously to realize the coloring using the ink jet printing apparatus, the present inventors have found that the stable discharge can be attained without causing undischarge to provide a colored matter of high density without blur under the conditions where the used ink contains a dye from 3.1 wt % to 30 wt % of all the ink, the viscosity being from 1.5 cP to 4 cP, and the surface tension being from 35 dyn/cm to 65 dyn/cm.

Also, another object of the present invention is to provide an ink jet recording apparatus and an ink jet recording method, wherein the recording speed of the ink jet recording apparatus will not decrease even when recording heads for specializing colors are provided.

An ink jet recording apparatus of the present invention uses a plurality of recording heads for forming an image on the recording medium by discharging the ink, the recording heads facing said recording medium being scanned in a main scan direction relative to said recording medium to form the image consisting of a number of dots of the ink on the recording medium, comprising head mounting means for mounting the plurality of recording heads, selecting means for selecting recording heads to be used for the recording in accordance with a recording mode from among the plurality of recording heads mounted on the head mounting means, and operation control means for effecting a desired operation only for the recording heads selected by the selecting means, wherein said recording heads selected are arranged on the head mounting means along the main scan direction consecutively for each recording mode.

An ink jet recording method of the present invention uses a plurality of recording heads for forming an image on the recording medium by discharging the ink, the recording heads facing the recording medium being scanned in a main scan direction to form the image on the recording medium, wherein said plurality of recording heads are arranged along the main scan direction consecutively for each recording mode, and the image is formed on the recording medium by selecting recording heads to be used for the recording in accordance with a recording mode from among the plurality of recording heads, and effecting a desired operation only for the recording heads selected.

As described above, since a plurality of recording heads are mounted on head mounting means, the recording heads to be used for the recording are selected in accordance with a recording mode from among the plurality of recording heads, and the recording heads selected in accordance with the recording mode are arranged consecutively, it is possible to record an excellent image with the ink jet recording having wide color reproducibility, without defect, and at sufficient speed, by selecting only necessary recording heads. Also, the longer life of recording heads, with the unit construction of an electrical image processor system, is attained by inhibiting access to recording heads not to be used, resulting in lower production costs and reduced apparatus costs. Also, the recording head to be selected in accordance with the recording mode can be unified, thereby resulting in better replaceability of heads.

Note that in this specification "print" includes "textile printing", and broadly means that the image is applied on the print medium such as the cloths or paper.

Also, examples of the printing medium include cloths, wall papers, papers, OHP films, and so on. In particular, the present invention is suitable for recording medium having a low water absorbance such as the cloths or wall paper.

In the present invention, the cloths include all kinds of woven or unwoven fabrics and other knits, without regard to materials, and how to weave or knit.

Also, in the present invention, the wall papers include pasting sheets for the wall composed of materials of paper, cloth, or synthetic resin sheet of polyvinyl chloride.

BRIEF DESCRIPTION OF THE DRAWINGS

FIG. 16 is a table showing the characteristics of each ink and the recorded results in examples and a comparative example in example 3.

DETAILED DESCRIPTION OF THE PREFERRED EMBODIMENTS

The present invention will be described below in detail with reference to the drawings.

Note that the present invention is described with an instance of a textile printing apparatus for printing on the cloths, but can be of course embodied in various forms including a printer.

First Embodiment

Figure 1:
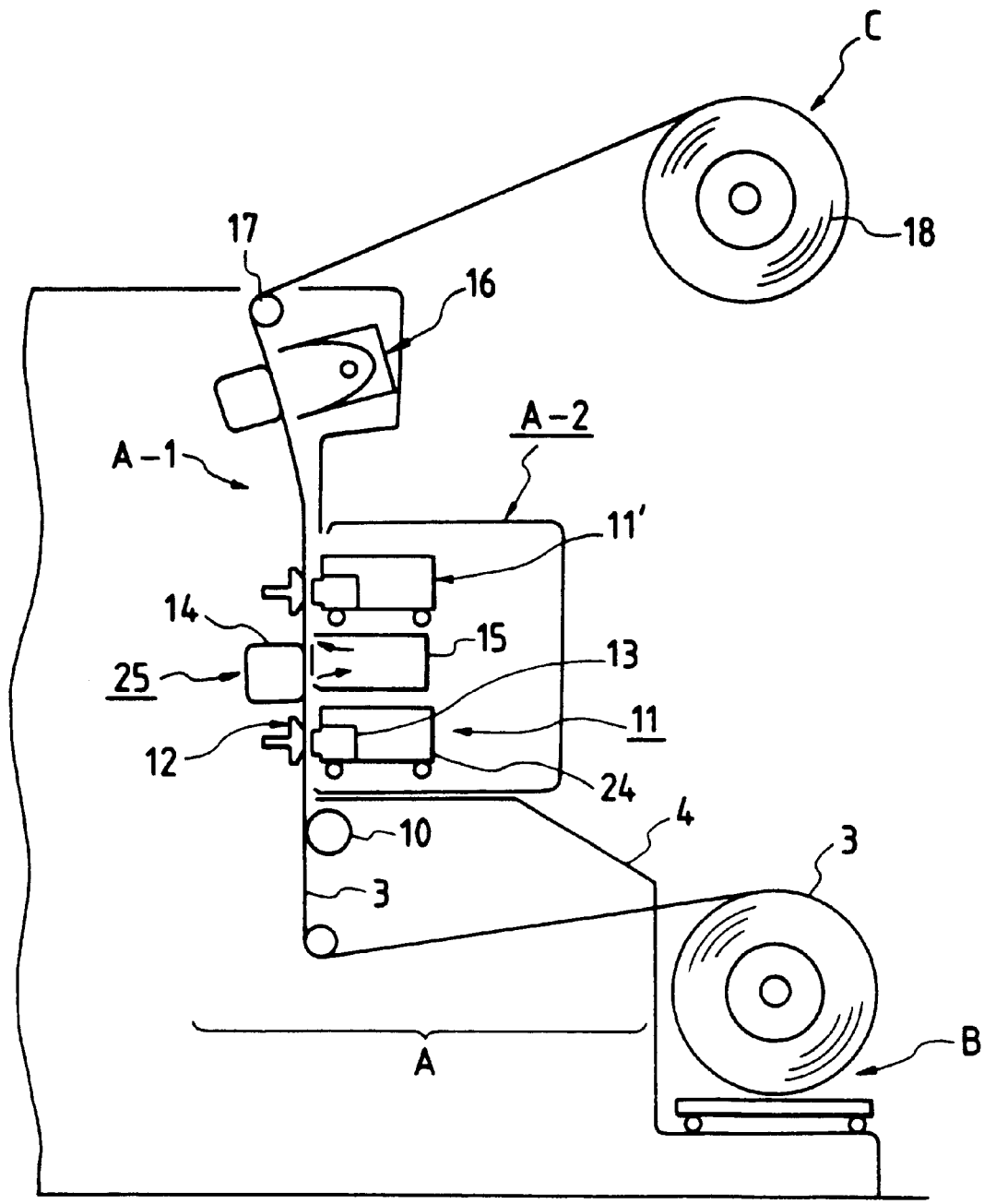
FIG. 1 is a cross-sectional side view of the mechanical constitution of a printer according to the present invention.
Figure 2:
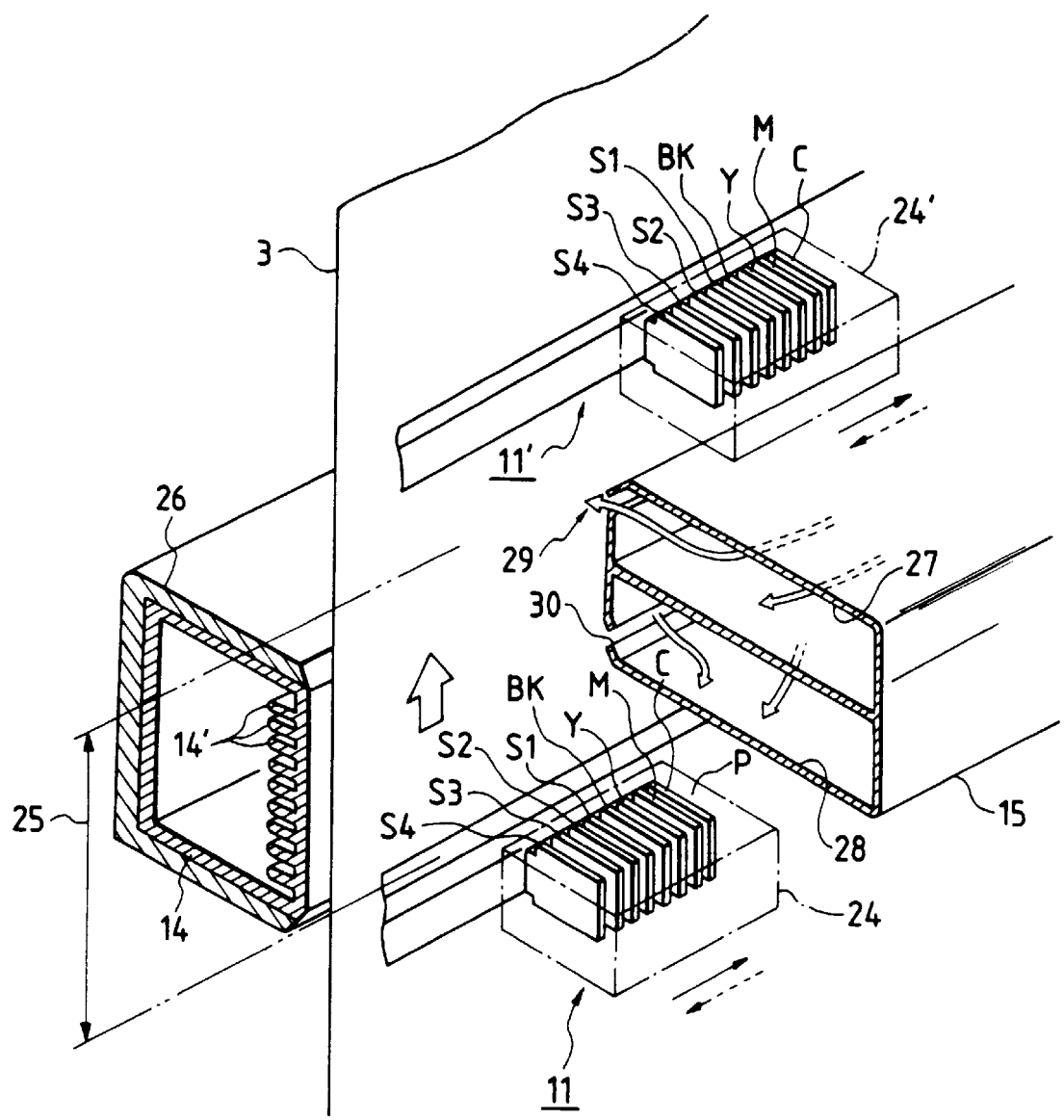
FIG. 2 is a perspective view showing a constitutional example around a printer head.

FIG. 1 shows a constitutional example of an ink jet printer as a textile printing apparatus according to the first embodiment, and FIG. 2 shows an enlarged perspective view of its essential part. The textile printing is largely comprised of a cloths supply unit B for delivering the pretreated cloths for the textile printing which is wound as a roll, a main unit for performing the printing by using an ink jet head while precisely feeding the cloths delivered, and a winding unit C for winding the printed cloths after drying them. And the main unit A further comprises a precision feeding unit A-1 for the cloths including a platen and a print unit A-2.

Pretreated roll-like cloths 3 are delivered from the cloths supply unit and fed stepwise into the main unit A.

The cloths 3 which have been fed stepwise are positioned in a first print unit 11 with the print surface regulated flat by a platen 12 on the back side, and printed by the ink jet head 13 on the front side. Every time one line of print is terminated, the cloths are fed by a predetermined step, and then dried through the heating by a heating plate 14, in addition to the hot air from the surface supplied/exhausted by a hot air duct 15. Subsequently, in a second print unit 11', the over-printing is performed in the same way as in the first print unit.

The cloths printed are dried again by a post drying unit 16 composed of a heating plate and a heater (or hot air), guided by a guide roll 17, and wound around a winding roll 18. And the wound cloths are removed from the main device, and subjected to a batch processing including coloring, washing, and drying to provide the final products.

In FIG. 2, the cloths 3 of printing medium are fed stepwise in an upper direction as shown. In the first print unit 11 provided downward in the figure, there is provided a first carriage 24 which can mount the ink jet heads for Y, M, C, Bk and specializing colors S1 to S4, i.e., eight ink jet heads in total (in the figure, there are mounted heads for Y, M, C, Bk and S1 to S4). The ink jet head (print head) in this embodiment uses elements for generating the heat energy to cause film boiling in the ink as the energy used to discharge the ink. Each head has 256 discharge orifices arranged at a density of 400 DPI (dots/inch).

Downstream of the first print unit is provided a drying unit 25 comprised of the heating plate 14 for heating from the back side, and the hot air duct 15 for drying from the front side. Heat transfer surface of the heating plate 14 can provide storing heating from the back side with the vapor of high temperature and high pressure passing through a hollow inside. On the inner side of the heating plate, fins 14' for the collection of heat are provided to concentrate the heat on the back side of the cloths 3 efficiently. The opposite side of the heating plate to the cloths 3 is covered with a heat insulating material 26 to prevent the heat loss due to heat radiation.

On the front side, the drying effect is further enhanced by blowing dry hot air from a supply duct 27 disposed downstream to apply the air of lower humidity to the drying cloths. And the air containing sufficient moisture and flowing in the opposite direction to a conveying direction of the cloths is sucked through a suction duct 28 disposed upstream by a much greater amount than a blowing amount, so that evaporated water contents are prevented from wetting and bedewing surrounding mechanical components. A supply source of hot air is provided on the rear side of FIG. 2, and the suction is performed from the fore side, so that the pressure difference between a blow-off opening 29 and a suction opening 30 placed opposed to the cloths is rendered even over the entire area in a longitudinal direction. Air blowing/suction unit is offset downstream relative to a center of the heating plate provided on the back side, so that the air may be directed to sufficiently heated portion. Thereby, the first print unit 11 can strongly dry a quantity of water contents in the ink including a reducer which has been absorbed into the cloths.

On the downstream (upper) side thereof, there is provided a second print unit 11' which is comprised of a second carriage 24' of the same constitution as the first carriage. Note that the first carriage 24 and the second carriage 24' are unified beforehand or via an appropriate connecting member, and a drive source for driving them and a transmission gear may be commonly used.

Also, there is provided an ink supply unit, not shown in FIG. 2, for reserving the ink and supplying a necessary amount of ink to the head, comprising an ink tank and an ink pump. Its main body and the head are connected via an ink supply tube or the like, whereby normally the amount of ink equal to discharged amount from the head is automatically supplied owing to capillary action. Also, in the head recovery operation, the ink is compulsorily supplied by an ink pump to the head. The head and the ink supply unit are mounted to the carriage separately provided, which is reciprocated in the directions as indicated by the arrow in FIG. 2 by a drive unit, not shown.

Also, there is provided a head recovery unit, not shown in FIG. 2, at a site opposed to the head at a home position (wait position) to maintain ink discharge stability of the head, which performs the operation as described below. That is, it performs a capping of the head at the home position to prevent evaporation of ink from inside the nozzles of the head 9 when not in operation (capping operation). Or it performs the function for withdrawing the ink discharged when performing an operation for compulsorily discharging the ink through the nozzles by applying a pressure on the ink flow channels within the head using the ink pump to exhaust bubbles or dirt within the nozzles before starting recording of the image (pressure recovery operation) or an operation for compulsorily sucking and discharging the ink through the nozzles (suction recovery operation).

Figure 3:
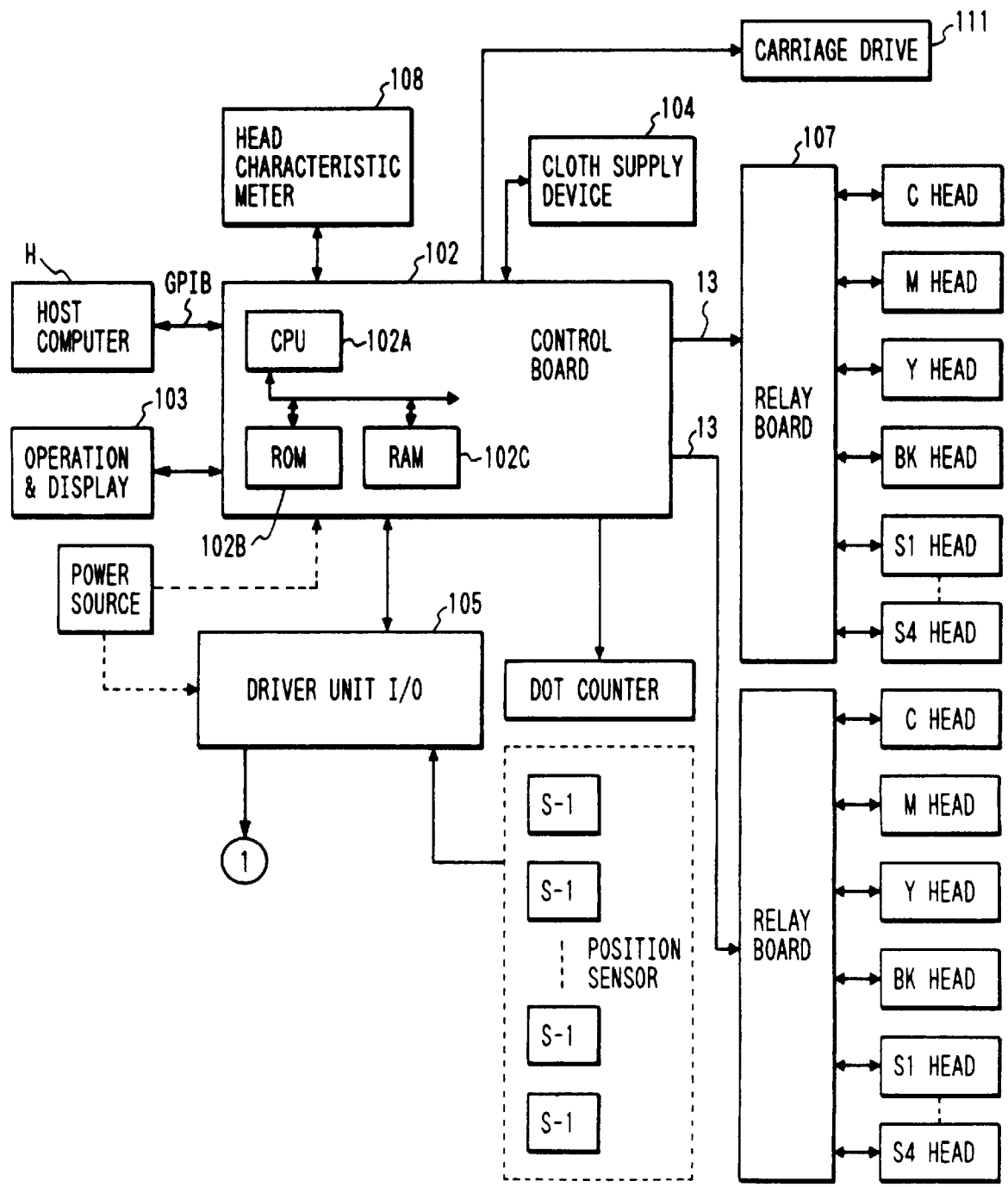
FIG. 3 is a block diagram showing an electrical configuration of the printer as shown in FIG. 1.
Figure 4:
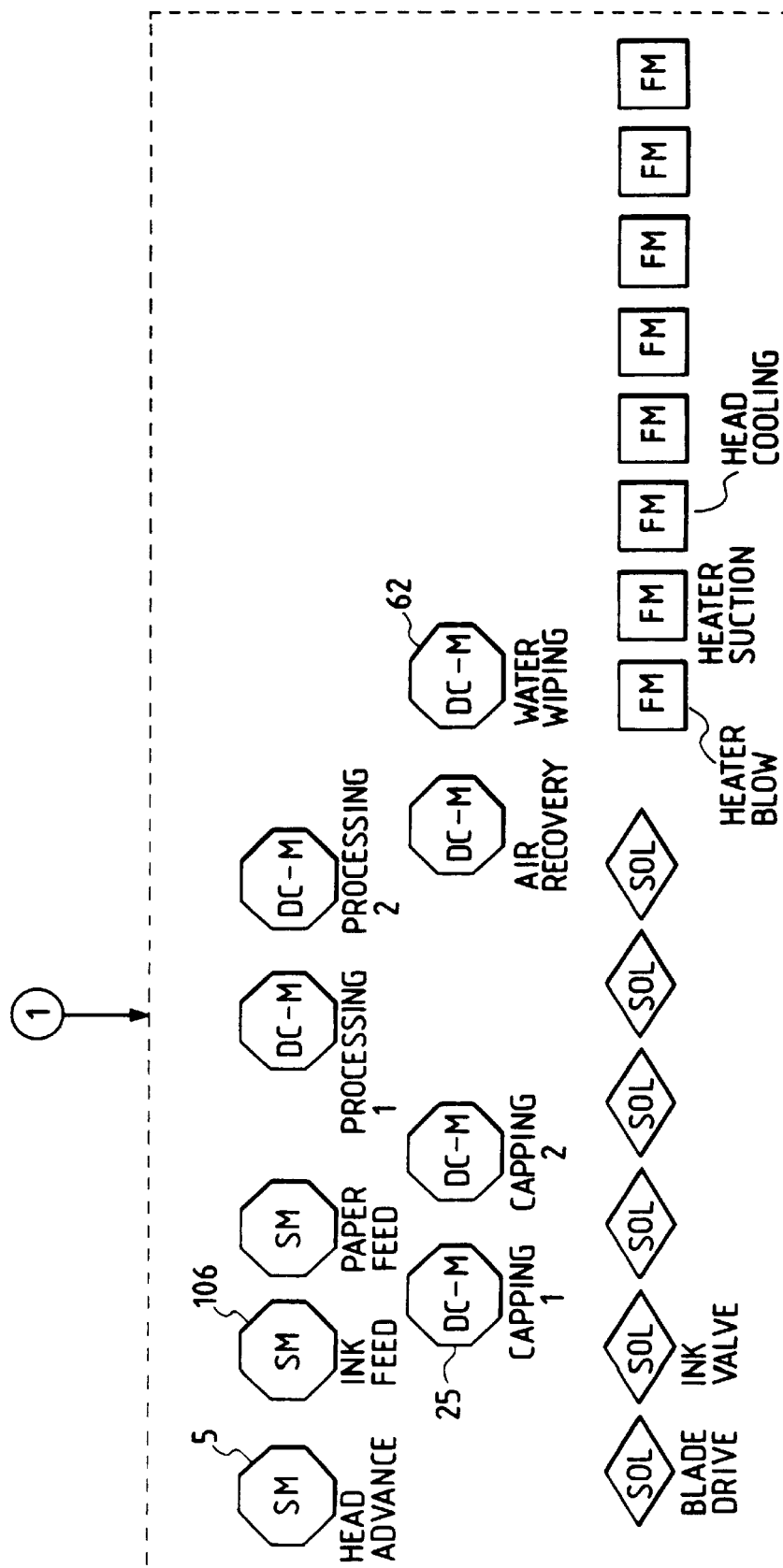
FIG. 4 is a block diagram.
Figure 6:
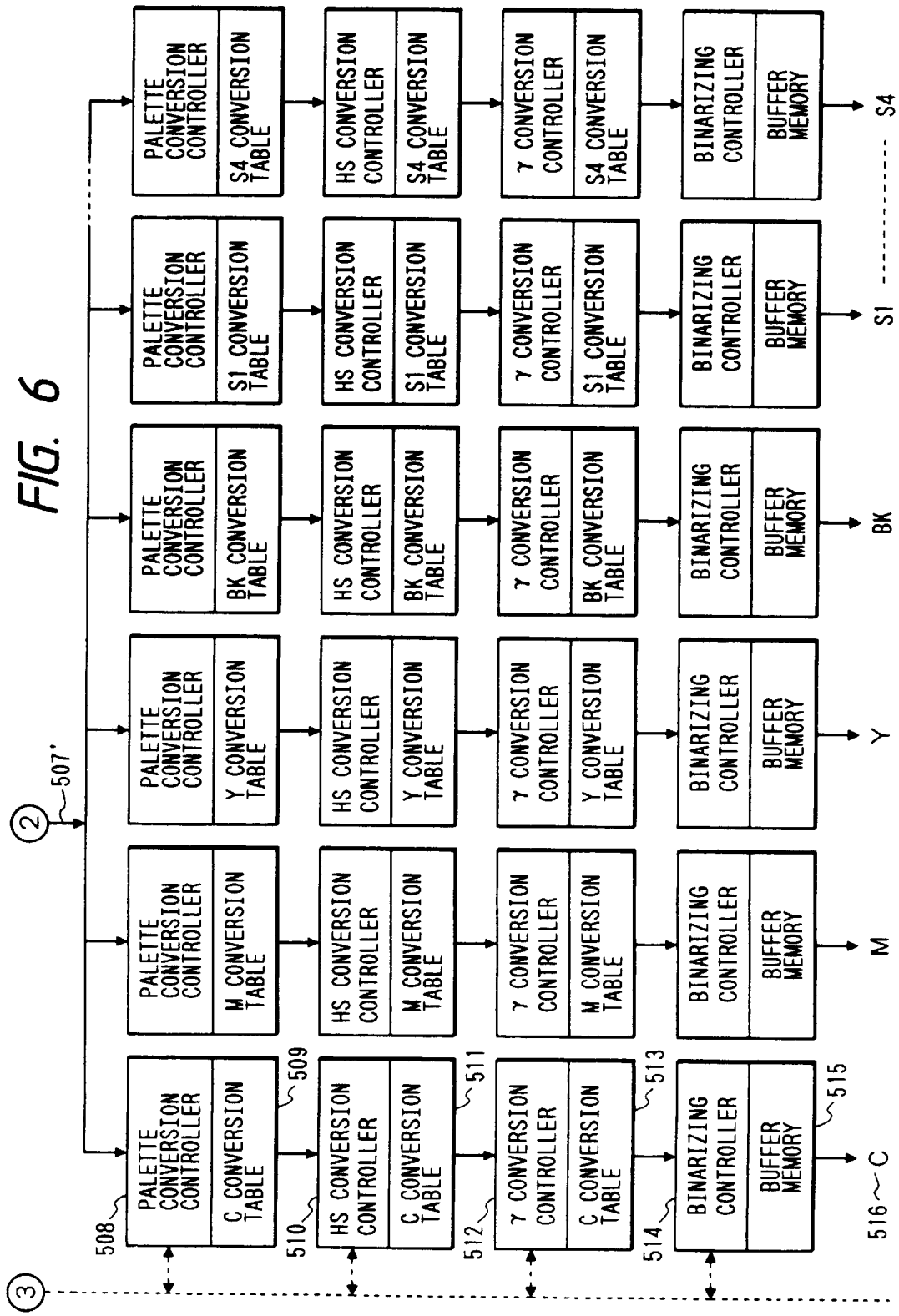
FIGS. 6 and 7 are block diagrams.
Figure 7:
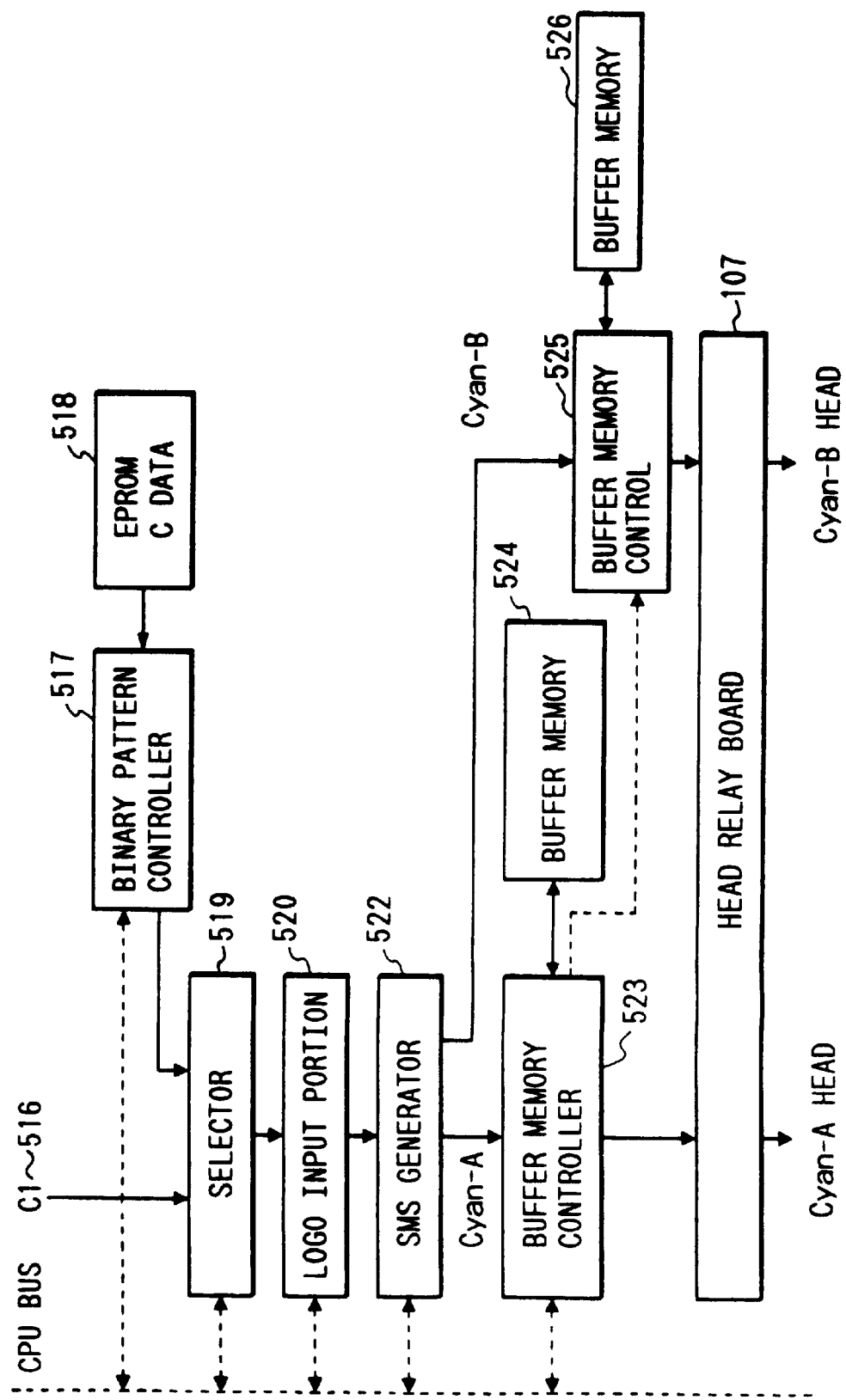

The configuration of a control system in this apparatus will be described below. FIGS. 3 and 4 show the configuration of an ink jet printer in this embodiment and a constitutional example of its operation unit, respectively, and FIGS. 5 to 7 show conceptually the internal constitutions of a control board 102 as shown in FIG. 3 along the flow of data.

Image data for printing, as well as color pallet data for determining a mixture ratio of Y, M, C or specializing color to reproduce excellently the colors selected by the designer, are sent from a host computer H via an interface (herein GPIB) to a control board 102, as disclosed in Japanese Patent Application No. 4-203973.

A device for sending image data is not specifically limited, and the transfer form may be via a network, or off-line via a magnetic tape. The control board 102 controls the overall apparatus, and is comprised of CPU 102A, ROM 102B having stored various programs, RAM 102C having various register areas and a working area, and each section as shown in FIGS. 5 to 7 and other figures. 103 is an operation/display unit having an operation board for the operator to issue a desired instruction to the printer P and a display for displaying a message to the operator. 104 is a cloths supply device comprising a motor for conveying the print medium such as cloths. 105 is a driver unit input/output unit for driving various motors (suffixed with "M") as shown in FIG. 4 and various solemoids (indicated by "SOL"). 107 is a relay board for receiving and supplying information concerning each head (e.g., presence or absence of a head or the color presented by the head) to the control board 102, as well as supplying a drive signal to each head. This information is transferred to the host computer H to demand the transfer of color pallet data for a color to be used, and additionally is used for the recognition of the range of mounting a head on the carriages 24, 24' and the setting of the scan range. Also, 111 is a drive unit such as a motor for causing the carriages 24, 24' to scan.

Figure 5:
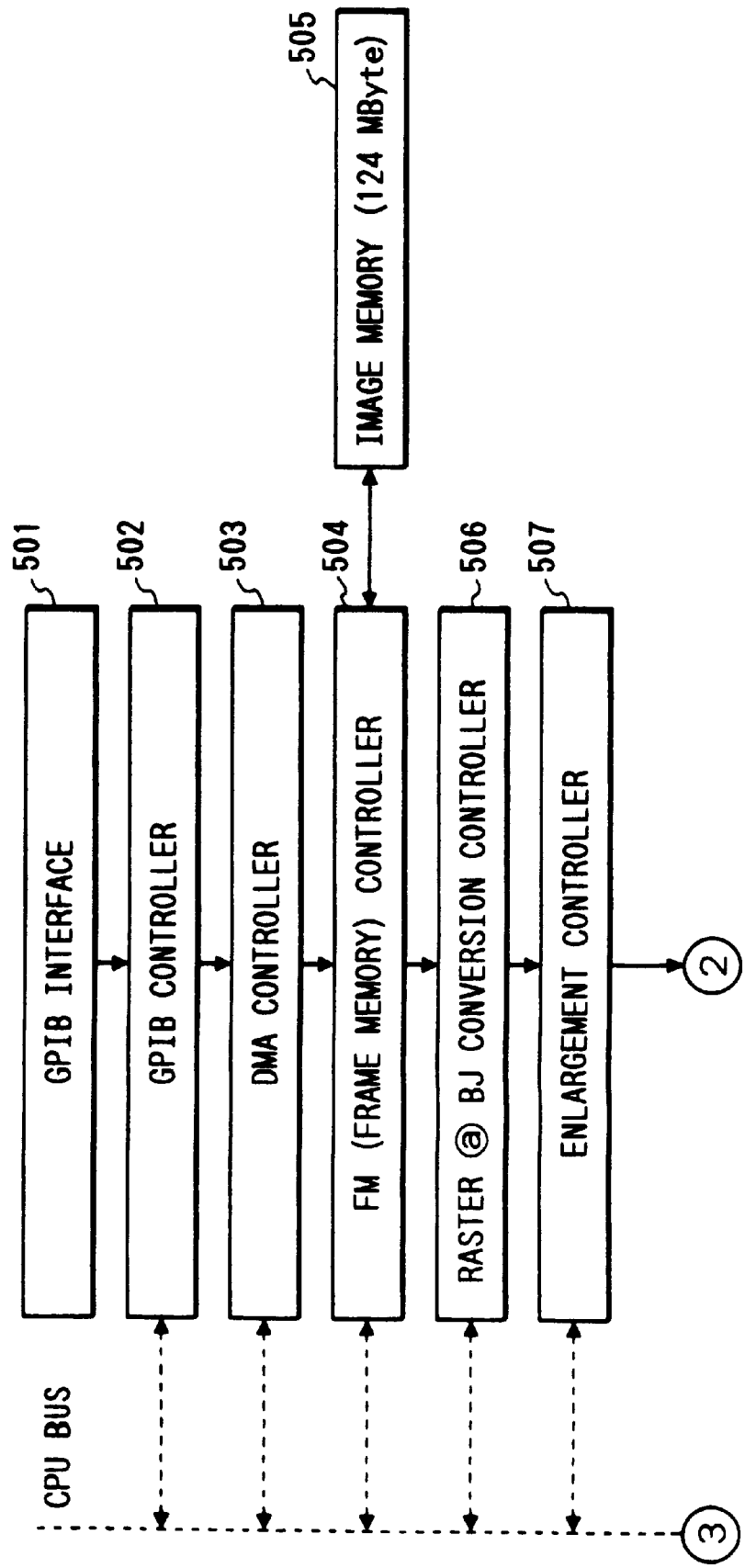
FIG. 5 is a block diagram showing the data flow through a part of constitution within a control board in FIG. 3.

Now, if image data to be printed is received from the host computer H, its image data is stored via a GPIB interface 501 and a frame memory controller 504 into an image memory 505 (see FIG. 5). The image memory in this embodiment has a capacity of 124 Mbyte, data of A1 size being composed of pallet data of 8 bits. That is, one pixel consists of 8 bits. 503 is a DMA controller for speeding up the memory transfer. After the transfer from the host computer H is terminated, the printing can be started through a predetermined processing.

The host computer connected to the printer in this embodiment transfers image data as a raster image. Since each print head has a plurality of ink discharge nozzles in a longitudinal direction thereof, the arrangement of image data must be converted to be matched with the print head. This data conversion is performed by a raster @ BJ conversion controller 506. And the data converted by this raster @ BJ conversion controller 506 is supplied through enlargement feature of a subsequent enlargement controller 507 for enlarging variably image data to a pallet conversion controller 508. Note that the data before the enlargement controller 507 has been transmitted from the host computer, and consists of an 8-bit pallet signal in this embodiment. This pallet data (8 bits) is commonly passed to a processor (hereinafter described) for each print head, and processed therein.

Note that the print heads of yellow, magenta, cyan, black and specializing colors S1 to S4 are provided in FIGS. 5 to 7.

Now, the pallet conversion controller 508 supplies pallet data and conversion tables for corresponding colors input from the host computer H to a conversion table memory 509.

In the 8-bit pallet, the number of reproducible color types is 256, i.e., from 0 to 255, wherein an appropriate table is expanded into a table memory 509 corresponding to each color.

In the 8-bit pallet, there are 256 reproducible color types from 0 to 255, and processed as follows, for example.

| | |
|---|---|
| when 0 is input | print in light gray |
| when 1 is input | solid print in specializing color 1 |
| when 2 is input | solid print in specializing color 2 |
| when 3 is input | print in blue-type color composed of a mixture of cyan and magenta |
| when 4 is input | solid print in cyan |
| when 5 is input | print in red-type color composed of a mixture of magenta and yellow |
| when 254 is input | solid print in yellow |
| when 255 is input | no print |

As a specific circuit configuration, the pallet conversion table memory 509 fulfills its function with conversion data written at an address position for pallet data. That is, when pallet data is supplied as the address, access to the memory is made in a read mode. Note that the pallet conversion controller 508 performs the management of pallet conversion table memory 509 and interfaces between the control board 102 and the pallet conversion table memory 509. Also, regarding the specializing colors, a circuit for setting the quantity of specializing color to be mixed (a circuit for multiplying the output by from 0 to 1 times) is inserted between it and the next-step HS system comprising an HS controller 510 and an HS conversion table memory 511, wherein its setting quantity can be variable.

The HS conversion controller 510 and the HS conversion table memory 511 make a correction for dispersion in print density corresponding to each discharge orifice of each head, based on data measured by a head characteristic meter 108 including an appropriate density unevenness correction unit. For example, data conversion is performed to be denser for discharge orifices with lower density (smaller discharge amount), and to be thinner for discharge orifices with higher density (greater discharge amount), and no data conversion is performed for discharge orifices with medium density. This processing will be described later.

A γ- conversion controller 512 and a γ- conversion table memory 513 subsequently provided are involved in table conversion for making the overall density denser or thinner for each color. For example, when none is performed, this is a linear table.

0 is output when 0 is input 100 is output when 100 is input 210 is output when 210 is input 255 is output when 255 is input A binarization controller 514 at the next step has a pseudo gradation function, in which it inputs 8-bit gradation data and outputs binarized pseudo gradation data consisting of one bit. Conversion from multi-value data to binary data may be made according to a dither matrix, or an error diffusion method, which is used in this embodiment, and in any case, though not detailed, other methods may be adopted as far as gradation representation can be made by the number of dots per unit area.

Binarized data hereby is stored in a buffer memory 515, and then used as the drive data for each print head. Binary data output from each buffer memory is in the form of C, M, Y, Bk, and S1 to S4. As binarized signal for each color is subjected to similar processing, binary data C is noted herein and explained with reference to FIG. 7. Note that the same figure shows the configuration of a print color cyan, but the same configuration applies for each color. FIG. 7 is a block diagram showing a circuit configuration following a buffer memory 515 as shown in FIGS. 5 and 6.

Binarized signal C is output to a sequential multi-scan generator 522 (hereinafter referred to as an SMS generator), but is also supplied to a selector 519 because the test print for a single apparatus may be practiced by pattern generators 517, 518. Of course, this switching is controlled by a CPU of the control board 102, so that data from the binary pattern controller 517 is selected to practice the test print when the operator performs a predetermined operation on the operation unit 103 (see FIG. 3). Accordingly, data from the binary controller 514 (buffer memory 516) is normally selected. 520 is a logo input portion inserted between the selector 519 and the SMS generator 522, which can deal with the printing of a logo, because in the textile printing, a logo mark such as a maker and a brand of designer is often attached at an end portion of the cloth. Its constitution may comprise, for example, a memory for storing logo data, and a controller for controlling the print position.

Note that the SMS generator 522 prevents uneven density of image due to changing discharge amount for each nozzle. Multi-scan has been proposed in Japanese Patent Application No. 4-79858, for example. The image quality is made preferential by performing the multi-scan, or discharging the ink through a multiple of discharge orifices for one pixel, or the higher speed is made preferential without performing such multi-scan, this designation being made by appropriate input means, for example, through the operation/display unit 103 or host computer H.

The buffer memory 524 is a memory for correcting the physical position of the head, i.e., the disposition between the upper and lower print units or between each head in FIG. 2, wherein image data is once entered in this memory, and output at a timing according to the physical position of the head. Accordingly, this buffer memory 524 has a different capacity for each print color.

After the data processing as described above, data is sent via the head relay board 107.

The main part of this embodiment with the above constitution will be described with reference to FIGS. 8 to 11.

Figure 8:
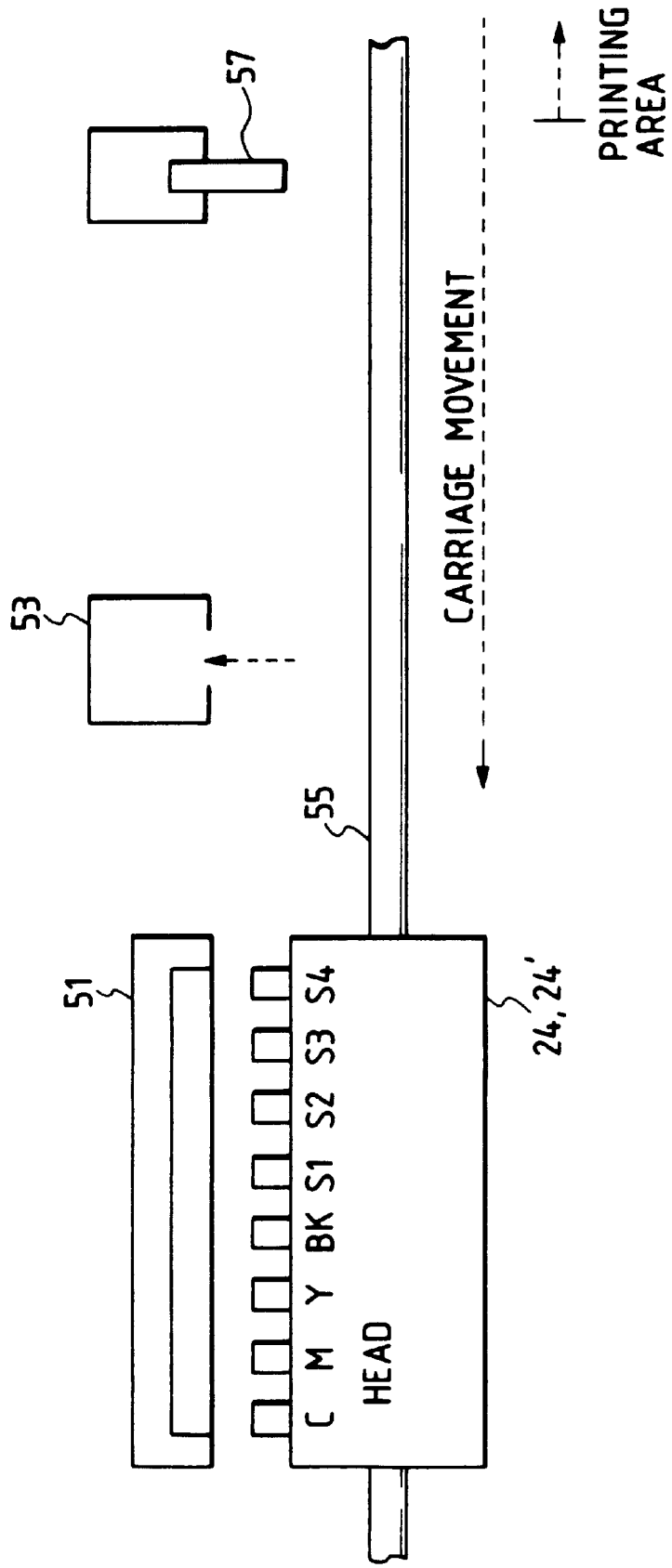
FIG. 8 is an explanation view typically showing recovery means for the head as shown in FIG. 1.

FIG. 8 shows typically so-called recovery means for effecting a processing to make the discharge condition more excellent for the head as shown in FIGS. 1 and 2. A capping member 51 has a function of the preventing the discharge face of the head from drying out, in such a manner as to cover the discharge face of the head with the capping member 51 during the non-printing or in stand-by (hereinafter referred to as a capping). Also, into an idle discharge box 53 is discharged the thicker ink residing inward of the discharge orifices of the heads, the thicker ink being discharged from S4 head to C head in succession while the carriage 24 or 24' is moving along a shaft 55. A wiping member 57 is an elastic member or a porous member for removing foreign matter attached onto the discharge face of the head, in such a manner as to make engagement with and wipe out the discharge faces of heads, successively, from S4 head to C head, in the course of the movement of the carriage 24 or 24'.

In the textile printing, in addition to four primary colors of cyan, magenta, yellow and black which are basic colors for the printing, colors which are difficult to represent with mixtures thereof are added in the form of specializing colors. For example, a vivid cobalt blue, a gold or a silver. Which color is to be added as the specializing color depends on the demands of a design original picture, whereby the specializing color varies with the print design at every time of printing. However, it is supposed that if four specializing colors at maximum are provided, the apparatus can deal with all the designs, and hereby four areas for mounting specializing color heads are reserved in this embodiment.

Figure 9:
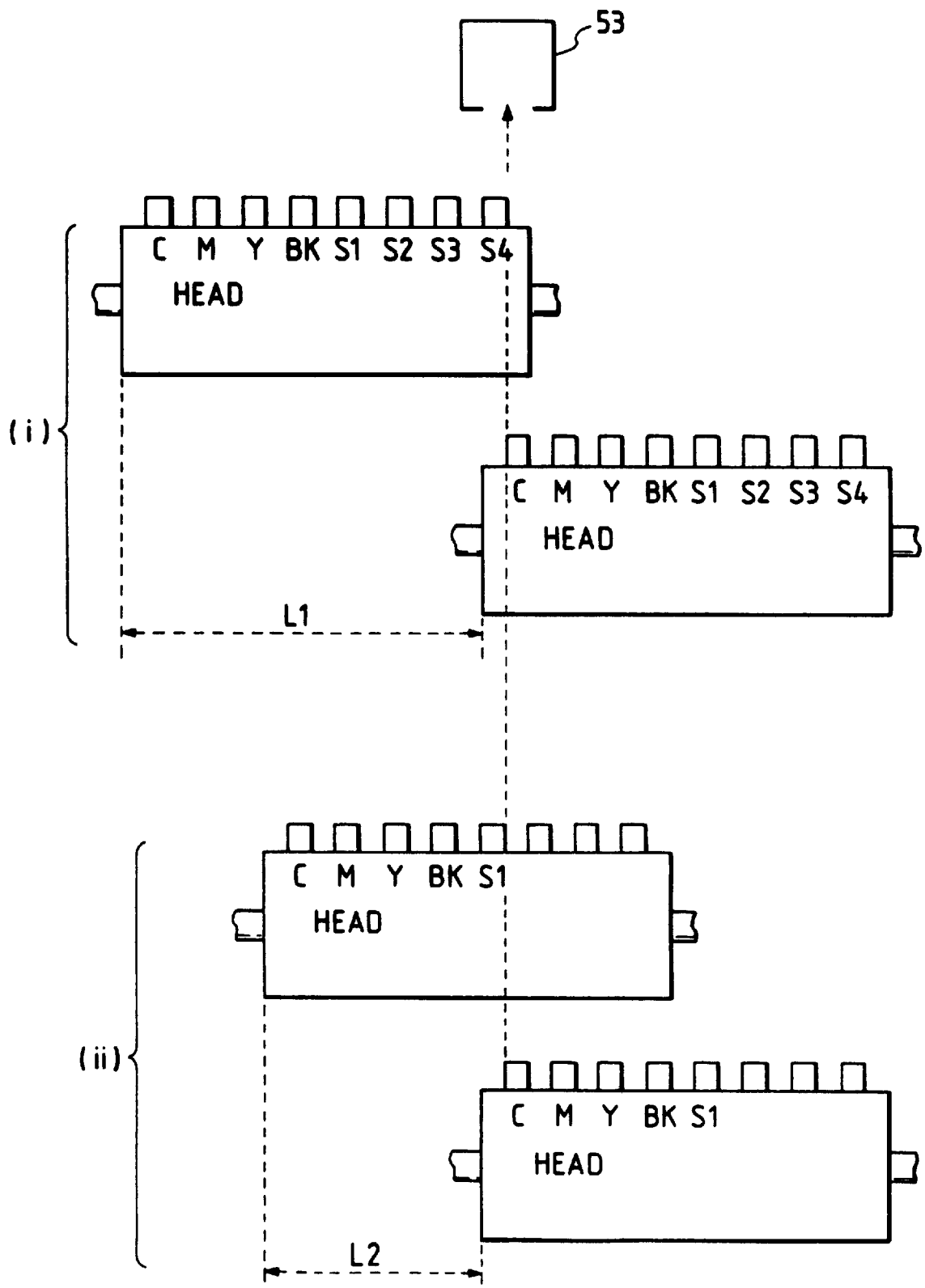
FIG. 9 is a view for explaining the movement range of a carriage with the head mounted on the carriage.

FIG. 9 shows the carriage movement range required to effect a discharge operation into the idle discharge box when four heads for specializing colors are mounted in addition to basic colors for the printing (i), and the carriage movement range when two heads for cyan are mounted without the use of specializing colors (ii). As seen from this figure, it is preferable for the higher printing speed to switch the movement distance of carriage by recognizing the number of heads mounted, or the mounting range, that is, the movement distance L1 is required when eight heads are mounted, while L2 is required when five heads are mounted.

It is needless to say that this is applicable not only to the idle discharge operation, but also to the wiping operation and the print operation.

Also, in the textile printing, the used ink is necessary to change because the feature of design may vary in accordance with the usage after processing the cloths.

In the textile printing for swimming suits or ski wear, very denser printing may be required. In such a case, it is possibly considered that the over-printing is performed by multiple scanning over the same printing surface to enhance the density, but this necessarily results in decreased print speed. Thus, in an instance of FIG. 9, the head mounting area for specializing colors on the carriage is used to mount a plurality of heads corresponding to denser print colors.

In this case, an image processing system as shown in FIGS. 5 to 7 is operated as follows. That is, in the pallet conversion table 508 of FIG. 6, C conversion table is left intact, M conversion table is replaced with C conversion table, Y conversion table is replaced with M conversion table, Bk conversion table is replaced with Y conversion table, and S1 conversion table is replaced with K conversion table. S2 to S4 conversion tables are set at "00" to suppress the output. Also, HS conversion table and γ conversion table at the next step and beyond are likewise replaced.

With the above processing, the binary output 516 of FIG. 6 becomes C, C, M, Y and Bk. Herein, where only cyan has a double density, and it is desired to decrease the density a little more, it is necessary that the inclination of γ conversion table for cyan be reduced a slight degree to obtain a desired decrease in density.

Figure 10:
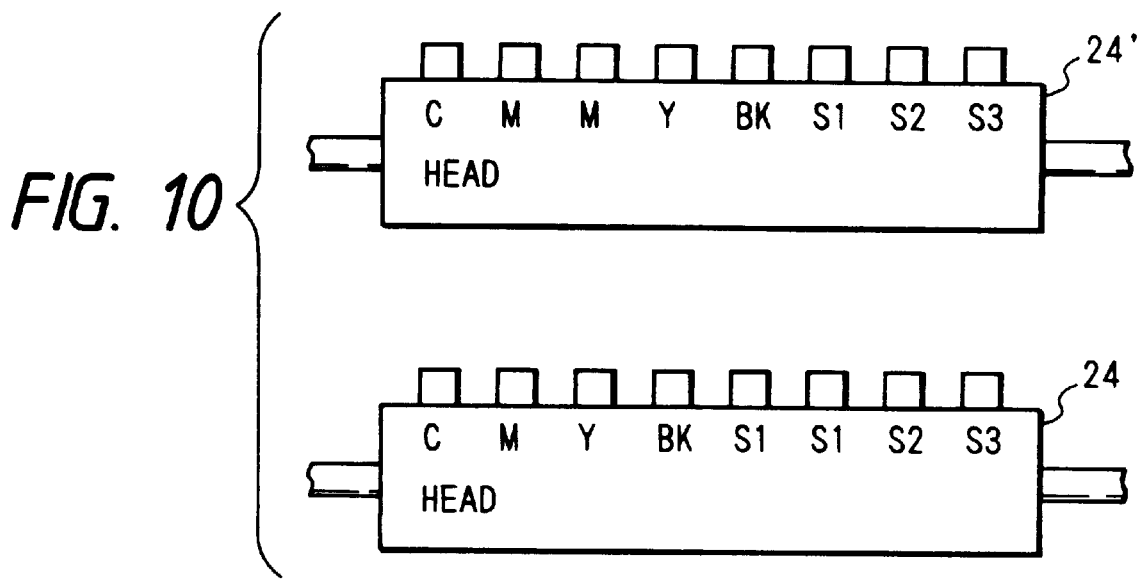
FIG. 10 is an explanation view where upper and lower carriages have different heads mounted.

In this way, by arranging the head of a color for which higher density is desired on the specializing color area, the density for the color can be enhanced. Note that the order of print heads or mixing the colors in this embodiment is not changed, and there is no change in color tint. FIG. 10 shows an example wherein two magenta heads are mounted on the upper carriage, and two specializing color heads S1 are mounted on the lower carriage. The table for the image processing system may be appropriately switched, even when different heads are mounted on the upper and lower carriages.

Figure 11:
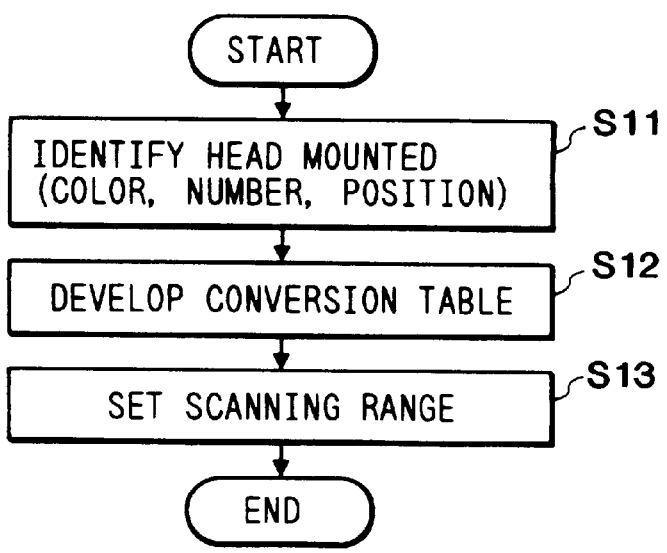
FIG. 11 is a flowchart showing the processing according to the head mounted on the carriage.

FIG. 11 shows an example of processing procedure for setting the content of conversion table and the scan range in accordance with the head mounted on the carriage.

First, at step S11, the heads mounted on the carriage are identified, that is, in respect of the colors, the number and the range of heads mounted. For example, means for identifying the number or range of heads mounted may involve measuring the head line-to-line impedance with the signal line between the relay board and the head of FIG. 3 and making an identification through CPU 102A, or making a judgment through on/off operation of a switch disposed at the head mounting position on the carriage. Also, an invention as disclosed in Japanese Laid-Open Patent Application No. 2-187343 is applicable in which the print head of a printer has means for presenting its own information (pattern cutting), which can be identified on the printer main body side. Such means for presenting that information may rely on the use of an EPROM or a DIP switch. To apply to this embodiment, that information may be an ink color for use with the print head, whereby the colors, the number or the range can be identified by the printer reading that information. Further, the operator can input that information by using the operation/display unit 103.

With such identified results, the control board 102 issues a required notification to the host computer H, and expands conversion data sent in response thereto into conversion tables 509, 511, 513 (step S12). Further, it sets the scanning range in idle discharge, wiping, and print area, as described in FIGS. 9 and 10, in accordance with the number or range of mounted heads (step S13).

It should be noted that the present invention may be effectively applied in either case where all or part of the print heads are detachable from the carriage, or all the heads are fixed without easy detachment premised. It will be understood that to allow for the setting of the scanning range only based on the information of the number of heads, when they are detachable therefrom, they may be arranged not to produce any gap in the head mounted portion on the carriage. Also, it will be understood that when all the heads are fixed, or when only part of the mounted heads are used for the printing, the information of used heads may be input, or identified by the host computer H analyzing the colors of original picture to make the setting of the scan range in accordance therewith.

Second Embodiment

A second embodiment will be now described particularly noting the enhanced print density. This embodiment can adopt the same apparatus constitution and processing procedure as those of the first embodiment, but this embodiment is suitable for obtaining a desired print density particularly when printing onto the cloths.

Figure 12:
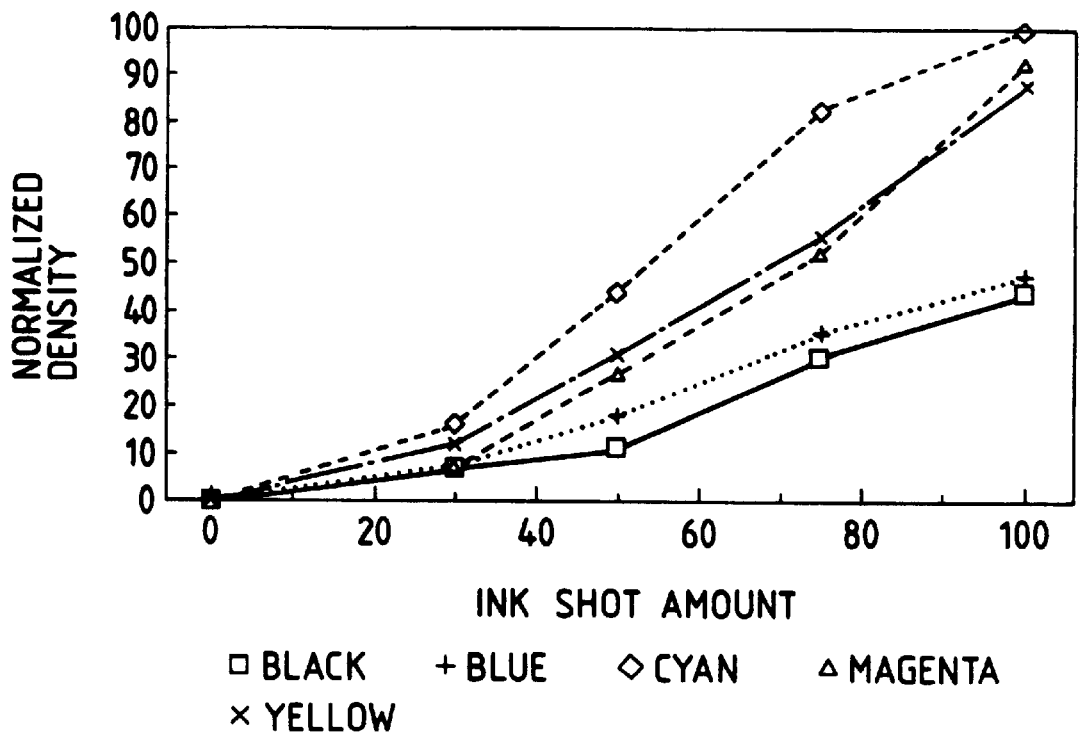
FIG. 12 is a diagram for explaining the normalized density of the ink for each color relative to the ink shot amount.

FIG. 12 shows the relation between ink shot amount and color density. In the figure, the axis of abscissas indicates the ink shot amount with the maximum shot amount per unit area being 100. The axis of ordinates indicates the normalized value of the color density visually observed referred to as a K/S value (K: absorption coefficient, S: scattering coefficient), which is a function of reflectance R of the colored matter of the cloths subjected to coloring process and washing process after printing thereon, as expressed by $$K/S=(1-R)^2/2R$$

In the same figure, with the maximum value of cyan defined as 100, values are normalized, in which the density is higher with a larger value. The same figure shows the characteristics for five colors including standard colors of yellow, magenta, cyan and black, and a specializing color blue.

As can be seen from this figure, with the same shot amount, the density of black and specializing color blue is approximately half that of yellow, magenta and cyan.

However, very high density printing is often demanded in the textile printing for swimming suits or ski wear. In such cases, when it is required to use black or specializing color blue for which the density is difficult to attain on design, it is conceived to enhance the density by raising the dye density for such color, controlling the size of ink droplets, or over-printing scanning across the same print surface by multiple times, but often causing a trouble in discharging, a lower print quality due to occurrence of streak or a slower print speed.

Figure 13:
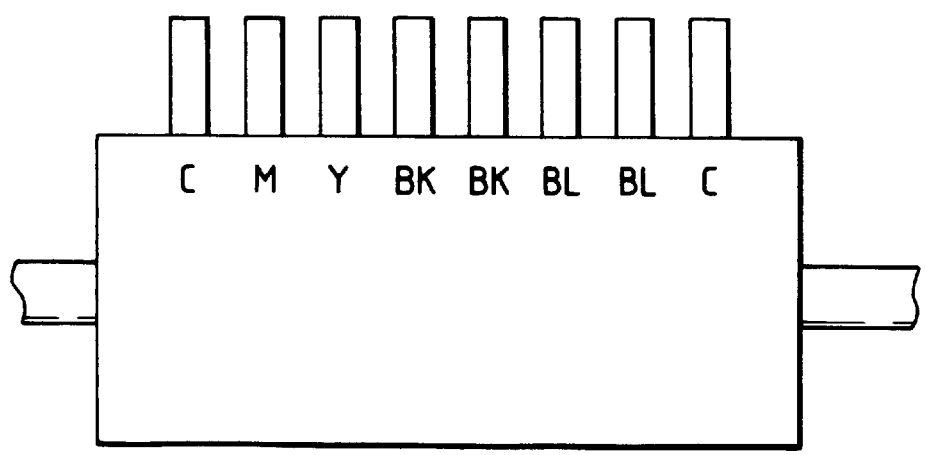
FIG. 13 is an explanation view where a head with higher density color is mounted on the carriage.

Thus, in this embodiment, a multiplicity of heads for the color for which higher density is desired, i.e., two heads for each of black and blue, are mounted in the head mounting area on the carriage as shown in FIG. 13.

In this case, in the image processing system as shown in FIGS. 5 to 7, the following measure can be taken. That is, in the pallet conversion table 508 of FIG. 6, conversion tables for C, M, Y and Bk are left intact, S1 conversion table is replaced with Bk conversion table, and S2, S3 conversion tables are replaced with BL (blue) conversion table. S4 conversion table is set at "00" to suppress the output. Also, the HS conversion table and the γ conversion table at the next step and beyond are likewise replaced.

With the above processing, the binary output 516 of FIG. 6 becomes C, M, Y, Bk and Bk. Herein, where only black and blue have a double density, and it is desired to decrease the density a little more, it is necessary that the inclination of γ conversion table for black and blue be reduced a slight degree to obtain a desired decrease in density.

Figure 14:
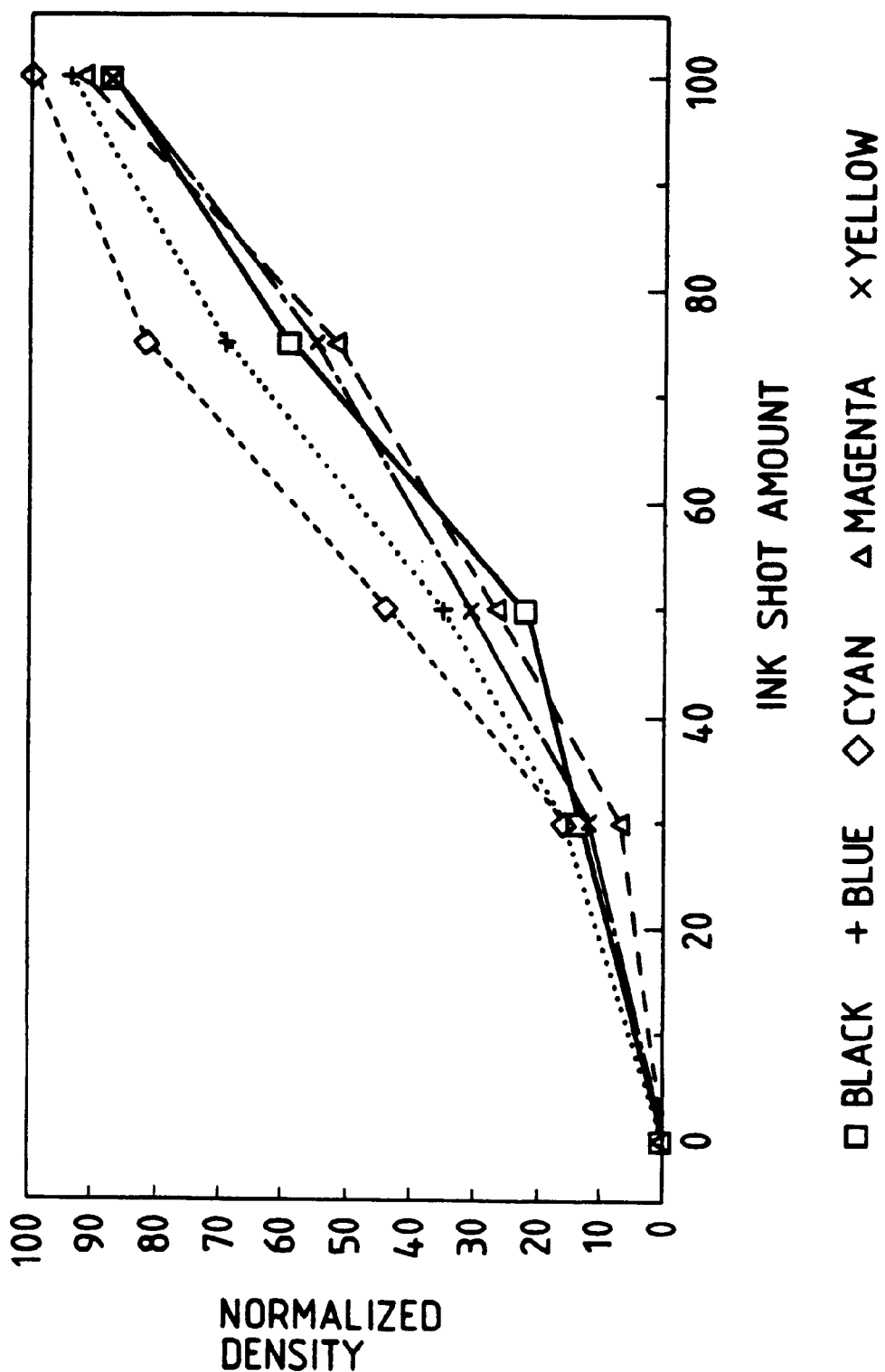
FIG. 14 is a diagram showing the normalized density of the ink for each color relative to the ink shot amount.

FIG. 14 shows the density when two heads of black and blue are mounted, as compared with FIG. 12. It is apparent that black and blue can represent the density equivalent to that of the other three colors.

In this way, by arranging the head of a color for which higher density is desired on the specializing color area, the density for the color can be enhanced. Note that the order of print heads or mixing the colors in this embodiment is not changed, and there is no change in color tint.

In this embodiment, like the first embodiment, it is also possible to set the content of the conversion table in accordance with the head mounted on the carriage using a processing procedure as shown in FIG. 11.

First, at step S11, the heads mounted on the carriage are identified, that is, in respect of the colors, the number and the range of heads mounted. Based on such identified results, the control board 102 issues a required notification to the host computer H, and expands conversion data sent in response thereto into conversion tables 509, 511, 513 (step S12). Further, if it sets the scanning range in idle discharge, wiping, and print area, as described in FIGS. 9 and 10, in accordance with the number or range of mounted heads, the processing of step S13 is performed, or otherwise step S13 is deleted or skipped.

While this embodiment has been described with a case where two print heads of black and blue are mounted to obtain a desired density, it should be noted that appropriate color heads can be mounted in proper number, in accordance with the design or the density, further with appropriate settings for the image processing system.

As described above, according to the present invention, an appropriate number of heads for the ink of desired color tint can be mounted, and by rewriting the contents of table for the expansion of conversion data to reproduce the color tint in accordance with the color tint of the head mounted, or switching the scanning range, i.e., the start position and the stop position, in print area, idle discharge area or wiping area in accordance with the number or range of mounted heads, it is possible to flexibly cope with the change of color tint used, the change of density or the steadiness of density, thereby improving the throughput by efficiently performing the processing in the above area or the high density print.

While the present invention has been described in connection with the first and second embodiments exemplifying a textile printing apparatus of ink jet recording system, it will be understood that the present invention is not limited to the ink jet printing system, but can be embodied in various printing systems. Particularly, when the ink jet printing system is used, the present invention brings about excellent effects particularly in the print head or printing apparatus of the system of having means for generating the heat energy (e.g., electricity-heat converters or laser beam) as the energy for use in discharging the ink and causing a state change in the ink due to the heat energy, among the various ink jet printing systems. With such a system, the higher density and higher precision printing can be attained.

As to its representative constitution and principle, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleus boiling corresponding to the recording information on electricity-heat converters arranged corresponding to the sheets or liquid channels holding a liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into the pulse shapes, growth and shrinkage of the bubbles can be effected instantly and adequately to accomplish more preferably discharging of the liquid (ink) particularly excellent in response characteristic. As the driving signals of such pulse shape, those as disclosed in U.S. Pat. Nos. 4,463,359 and 4,345,262 are suitable. Further, excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging orifice, liquid channel, and electricity-heat converter (linear liquid channel or right-angled liquid channel) as disclosed in the above-mentioned respective specifications, the constitution by use of U.S. Pat. Nos. 4,558,333 or 4,459,600 disclosing the constitution having the heat acting portion arranged in the flexed region is also included in the present invention. In addition, the present invention can be also effectively made using the constitution as disclosed in Japanese Laid-Open Patent Application No. 59-123670 which discloses the constitution using a slit common to a plurality of electricity-heat converters as the discharging portion of the electricity-heat converter or Japanese Laid-Open Patent Application No. 59-138461 which discloses the constitution having the opening for absorbing pressure wave of heat energy correspondent to the discharging portion. That is, according to the present invention, the printing can be performed securely and efficiently in whatever form the print head may be formed.

In addition, among the print heads of the serial type as described above, the present invention is effective for a print head secured to the main device, a print head of the freely exchangeable chip type which enables electrical connection to the main device or supply of ink from the main device by being mounted on the main device, or a print head of the cartridge type having an ink tank integrally provided on the print head itself.

Also, addition of a restoration means for the recording head, a preliminary auxiliary means, etc., provided as the constitution of the recording device of the present invention is preferable, because the effect of the present invention can be further stabilized. Specific examples of these may include, for the recording head, capping means, cleaning means, pressurization or suction means, electricity-heat converters or another type of heating elements, preliminary heating means according to a combination of these, and preliminary discharging means for discharging apart from the printing.

In addition, though the ink is considered as the liquid in the embodiments of the present invention as above described, other inks may be also usable which are solid below room temperature and will soften or liquefy at or above room temperature, or liquefy when a use print signal is issued as it is common with the ink jet device to control the viscosity of ink to be maintained within a certain range of the stable discharge by adjusting the temperature of ink in a range from 30° C. to 70° C. In addition, in order to positively avoid the temperature elevation due to heat energy by utilizing the heat energy as the energy for the change of state from solid to liquid, or to prevent the evaporation of ink, ink which will stiffen in the shelf state and liquefy by heating may be used. In any case, the use of ink having a property of liquefying only with the application of heat energy, such as those liquefying with the application of heat energy in accordance with a print signal so that liquid ink is discharged, or already starting solidifying upon reaching the printing medium, is also applicable in the present invention. In such a case, the ink may be held as liquid or solid in recesses or through holes of a porous sheet, which is placed opposed to electricity-heat converters, as described in Japanese Laid-Open Patent Application No. 54-56847 or No. 60-71260. The most effective method for the ink as above described in the present invention is based on the film boiling.

Further, the present invention is applicable in the form of an image output terminal for use in an information processing equipment such as a computer, a copying machine in combination with a reader, or a facsimile terminal equipment having the transmission and reception feature.

Embodiment 3

A preferred embodiment of the ink jet printing method will be now described in which a stable discharge can be performed without causing undischarge in the ink jet printing having a long print length, thereby providing an excellent colored matter without image defects.

The ink for use in the present invention is composed of coloring matter, water, organic solvent and additive agent.

The coloring material is preferably a dye, as far as it is colorable on the printing medium. Examples include acid dye, direct dye, cation dye, reactive dye, disperse dye, vat dye and soluble vat dye. One or more kinds of these dyes are contained in the ink, and can be used together with a dye of different hue, its use amount being typically from 3.1 wt % to 30 wt % of the total amount of ink, preferably from 3.5 wt % to 25 wt %, and particularly for black ink, preferably from 5 wt % to 20 wt %, to obtain a sufficient coloration on the printing medium.

The amount of water which is preferable for the main component of the ink is from 10 wt % to 93 wt % of the total amount of ink, preferably from 25 wt % to 87 wt %, and more preferably from 30 wt % to 80 wt %.

Examples of organic solvent may include, for example, ketone or ketone alcohols such as acetone and diacetone alcohol, ethers such as tetrahydrofuran and dioxane, oxyethylene or oxypropylene addition polymers such as diethylene glycol, triethylene glycol, tetraethylene glycol, dipropylene glycol, tripropylene glycol, polyethylene glycol, and polypropylene glycol, glycol, alkylene glycols in which alkylene group contains two to six atoms, such as ethylene glycol, propylene glycol, trimethylene glycol, butylene glycol, 1,2,6-hexantriol, and hexylene glycol, polyhydric alcohol lower alkylethers such thiodiglycol, glycerin, ethylene glycol monomethyl (or ethyl) ether, diethylene glycol monomethyl (or ethyl) ether, triethylene glycol monomethyl (or ethyl) ether, polyhydric alcohol lower dialkyl ethers such as triethylene glycol dimethyl (or ethyl) ether, tetraethylene glycol dimethyl (or ethyl) ether, sulfolane, N-methyl-2-pyrrolidone, and 1,3-dimethyl-2-imidazolidinone.

The content of water soluble organic solvent is typically from 2 wt % to 60 wt % of the total ink weight, and preferably from 5 wt % to 50 wt %.

Although the medium as cited above can be used singly or in combination, the most preferable liquid medium composition is the solvent containing at least one kind of polyhydrix alcohol. In particular, thioglycol, diethylene glycol, or a mixture of diethylene glycol and thiodiglycol are excellent.

The main ingredients of the ink for use with the present invention are as follows, although other well-known various agents such as dispersant, surface active agent, viscosity control agent, surface tension control agent, fluorescent whitening agent may be added as necessary.

For example, viscosity control agents such as polyvinyl alcohol, celluloses, and water soluble resin, surface active agent of cation or nonion type, surface tension control agents such as diethanolamine and triethanolamine, pH control agent with buffer solution, and mildew resistant agent.

A particularly important point in the ink jet print method of the present invention is that the ink viscosity is controlled in a range from 1.5 cP to 4 cP, preferably from 2.0 cP to 3.8 cP, and the surface tension is controlled in a range from 35 dyn/cm to 65 dyn/cm, preferably from 35 dyn/cm to 62 dyn/cm. Within such ranges, the objects of the present invention can be achieved.

That is, to perform the ink jet print method having a long print length, like the ink jet print method of the present invention, the ink material must be controlled under more severe conditions than the ink used in the conventional recording.

If the viscosity of the ink used in the ink jet printing method of the present invention exceeds 4 cP, the undischarge may abruptly increase, or the stable discharge may fail due to increased viscosity by heating. If the viscosity is lowered below 1.5 cP, more blur will occur, or the discharge becomes unstable (occurrence of satellite).

Even if the viscosity of ink is made within the range of this embodiment, the length of undischarge (length of void arising on the cloth), when not discharged, may extend over several tens centimeters, when the surface tension is 35 dyn/cm or less. That is, the recovery of undischarge is not allowed smoothly. If there is even one undischarge extending over several tens centimeters, the cloth is unusable, unpreferably.

On the contrary, if the surface tension exceeds 65 dyn/cm, the frequency response decreases, resulting in unstable discharge.

As described above, the effects of the present invention in the ink jet printing method having a longer print length can be obtained by allowing both the viscosity and the surface tension to fall within the range of the present invention, and if either one of them is out of this range, the effects of the present invention can not be obtained.

The viscosity and the surface tension of the ink for use with the present invention can be easily controlled by the technicians skilled in the art by appropriately selecting the kind or amount of dyes and organic solvents used, in combination, or by adding various kinds of addition agents.

The printing medium for use in the present invention is preferably the cloths, the material making up the cloths is not particularly limitative, but examples include natural fibers, regenerated fibers, semi-synthetic fibers, and synthetic fibers such as cotton, silk, nylon, polyester, rayon, and acetate. The above fibers can be used in the form of woven, knit or non woven fabrics.

To obtain better colored matter, it is preferable to subject the above cloths to conventional pretreatments. In particular, the cloths have 0.01 wt % to 5 wt % of alkaline substance contained, when the ink containing a reactive dye is used, or generally, the cloths have 0.01 wt % to 20 wt % of a substance selected from a group of water soluble metallic salt, water soluble polymer, urea, and thiourea contained therein, from the viewpoints of preventing the fluff or blur.

Examples of alkaline substance include alkaline metal hydroxide such as sodium hydroxide and potassium hydroxide, amines such as mono-, di-, or tri-ethanolamine, and alkaline metal carbonate or hydrogencarbonate such as sodium carbonate, potassium carbonate and sodium hydrogencarbonate. Further, they include organic acid metallic salt such as calcium acetate and barium acetate, ammonia and ammonium compounds. Also, sodium trichloroacetate which becomes alkaline substance under the steaming and drying may be used. Particularly preferable alkaline substance may be sodium carbonate and sodium bicarbonate for use in coloring of reactive dye.

Examples of water soluble polymer include starch substances such as corn and wheat flour, cellulose substances such as carboxymethyl cellulose, methyl cellulose and hydroxyethyl cellulose, polysaccharides such as sodium alginate, gum arabic, locust bean gum, tragacanth gum, guar gum, and tamarind seeds, protein substances such as gelatin and casein, and natural water soluble polymers such as tannin type substance and lignin type substance.

Also, examples of synthetic polymer include polyvinyl alcohol compounds, polyethylene oxide compounds, acrylic acid type water soluble polymer, and maleic anhydride type water soluble polymer. Among them, polysaccharide polymer and cellulose polymer are preferable.

Examples of water soluble metallic salt include compounds having a pH of 4 to 10 and making typical ionic crystals such as halides of alkaline metal and alkaline earth metal. Typical examples of such compound include alkaline metals such as NaCl, $Na_2SO_4$, KCL and $CH_3COONa$, and alkaline earth metals such as $CaCl_2$ and $MgCl_2$. Among them, salts of Na, K and Ca are preferable.

Next, an apparatus for use with the ink jet printing method of the present invention using the above-described ink will be described by way of example.

The system is largely constituted of a reading unit for reading an original image created by the designer, an image process unit for inputting and processing original image data read, and an image printing unit for performing the printing onto the cloths based on the image data created by the image process unit.

The image reading unit reads an original image with a CCD image sensor for the output of an electrical signal to the image process unit. The image process unit creates data for driving an ink jet printing unit which discharges four color inks of magenta, cyan, yellow and black as will be described later from input original data. In creating data, image processing for reproducing original image with ink dots, coloration for determining color tones, alteration of layout, and coordination/selection of the design size such as enlargement or reduction.

Figure 15:
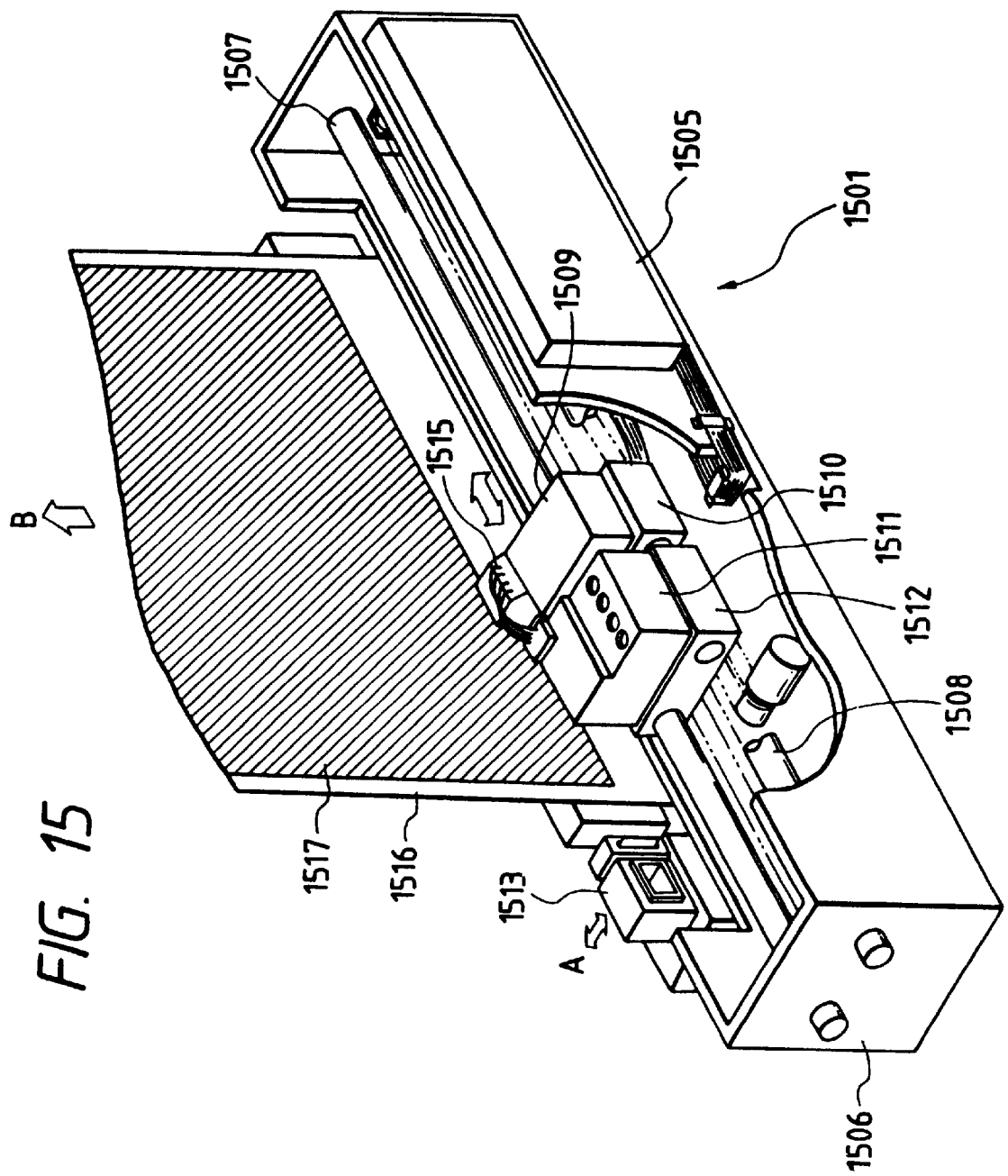
FIG. 15 is a view showing the main part of an ink jet printing apparatus according to the present invention.

FIG. 15 is a perspective view showing an image recording unit as an example of the ink jet printing apparatus for use with the present invention.

First, the ink jet printing unit 1501 is largely constituted of a frame 1506, two guide rails 1507, 1508, an ink jet head 1509 and a carriage 1510 for its movement, an ink supply device 1511 and a carriage 1512 for its movement, a head recovery device 1513, and an electrical system 1505. The ink jet head 1509 (hereinafter simply referred to as a head) comprises a plurality of columns of discharge orifices, and converters for converting an electric signal into ink discharging energy, and is further provided with a mechanism for selectively discharging the ink through the columns of discharge orifices in accordance with an image signal sent from the image process unit (not shown).

The head may be a print head which discharges the ink by the use of heat energy, which is preferably a head comprising electricity-heat converters (heat generating elements) for generating the heat energy for the supply to the ink, thereby causing a state change in the ink due to heat energy applied by the electricity-heat converters to discharge the ink through discharge orifices based on the state change.

The ink supply device 1511 serves to reserve the ink, and supply a necessary amount of ink to the head, comprising an ink tank and an ink pump, which are not shown. This main device and the head 1509 are connected via an ink supply tube 1515, whereby the ink is automatically supplied to the head 1509, normally owing to capillary action, by the same amount as discharged from the head. In the head recovery operation as will be later described, the ink is compulsorily supplied to the head 1509 by using the ink pump.

The head 1509 and the ink supply device 1511 are mounted on a carriage 1510 and a carriage 1512, respectively, for the reciprocal movement along the guide rails 1507, 1508 by a driving device, not shown.

The head recovery device 1513 is provided at a site opposed to the head 1509 at a home position (waiting position) of the head 1509 to maintain the ink discharge stability of the head, and is movable forward and backward in the directions of the arrow A to perform the operations as specifically described in the following.

First, when not operated, the head recovery device 1513 makes a capping for the head at the home position (capping operation) to prevent the evaporation of the ink from within the nozzles of the head 1509. Further, it performs a function of withdrawing the ink to be discharged in performing the operation of compulsorily discharging the ink through the nozzles by pressurizing the ink flow channels within the head using an ink pump to remove bubbles or dirt within the nozzles, before starting the image recording, or the operation of compulsorily sucking and discharging the ink through the nozzles (suction recovery operation).

An electrical system 1505 comprises a power supply unit and a drive control unit for performing the sequence control of the whole ink jet recording unit. The cloths 1516 are conveyed a predetermined distance in a sub-scan direction (or a direction of the arrow B) by conveying device, not shown, every time the head 1509 has recorded a predetermined length by moving in a main scan direction along the carriage 1507, thereby accomplishing the formation of an image. In the figure, an oblique line portion 1517 indicates the recorded portion.

It should be noted that the recording head 1509 may be an ink jet recording head for the monochrome printing, a plurality of recording heads for the color recording having different color inks, or a plurality of recording heads for the gradation recording with the same color at different densities.

Also, it should be noted that this apparatus is applicable to the cartridge type in which recording head and ink tank are integrated, as well as the other types in which recording head and ink tank are separately provided and connected via an ink supply tube, without regard to the constitution of recording means and the ink tank.

With the method for discharging the ink by the use of heat energy used in the present invention, the recording can be performed at higher density and higher precision.

With the above method, the cloths with the ink applied are subjected to heat treatment to attach dye to the cloths. Heat treatment may be any one of conventional well-known methods, including, for example, a steaming method, an HT steaming method, or a thermofix method, and if not using the cloths pretreated with alkali when alkali agent is required for fixation, an alkali pad steam method, an alkali blotch steam method, and an alkali shock method.

Further, by washing the cloths having undergone the above treatment, and removing unreacted dye by conventional well-known methods, the colored matter can be obtained.

The printing method of the present invention is applicable for office uses or personal uses, and particularly suitable for industrial uses except for office uses, namely, in industrial practices.

It should be noted that the obtained colored matter are then cut off in desired size, cut pieces are subjected to the process for providing the final articles such as stitching, bonding, and welding, to provide articles such as a necktie or a handkerchief.

Next, the specific ink compositions will be given below by using several examples and comparative examples. Note that "part" and "%" in the text are referenced in weight.

The inks A to D are embodiments of the present invention, and the inks E to H are comparative examples.

1. Ink Preparation

The following ingredients were mixed, and a mixed solution was adjusted to pH 8.4 by sodium hydroxide, and after agitation for two hours, was filtered through Floropore filter FP-100 (trade name, manufactured by Sumitomo Electric Industries) to obtain water-color inks A to H as presented in the following.

Note that the viscosity and the surface tension of each ink will be described later using a table as shown in FIG. 16.

| Ink A: | | |
|---|---|---|
| | C.I. Reactive Black 39 | 15.0 parts |
| | Thiodiglycol | 15.0 parts |
| | Diethylene glycol | 10.0 parts |
| | water | 60 parts |
| Ink B: | | |
| | C.I. Reactive Red 24 | 11.0 parts |
| | Thiodiglycol | 10.0 parts |
| | Diethylene glycol | 20.0 parts |
| | water | 59.0 parts |
| Ink C: | | |
| | C.I. Reactive Blue 72 | 8.0 parts |
| | Thiodiglycol | 20.0 parts |
| | Diethylene glycol | 10.0 parts |
| | water | 62.0 parts |
| Ink D: | | |
| | C.I. Reactive Yellow 95 | 11.0 parts |
| | Thiodiglycol | 25.0 parts |
| | Diethylene glycol | 10.0 parts |
| | Water | 54.0 parts |
| Ink E: | | |
| | C.I. Reactive Black 39 | 15.0 parts |
| | Thiodiglycol | 15.0 parts |
| | Diethylene glycol | 15.0 parts |
| | Water | 55.0 parts |
| Ink F: | | |
| | C.I. Reactive Black 39 | 15.0 parts |
| | Thiodiglycol | 10.0 parts |
| | Diethylene glycol | 20.0 parts |
| | Water | 75.0 parts |
| Ink G: | | |
| | C.I. Reactive Red 24 | 11.0 parts |
| | Isopropyl alcohol | 10.0 parts |
| | Thiodiglycol | 10.0 parts |
| | Diethylene glycol | 20.0 parts |
| | Water | 49.0 parts |
| Ink H: | | |
| | C.I. Reactive Red 24 | 11.0 parts |
| | Glycerin | 10.0 parts |
| | Water | 79.0 parts |

Also, the following ingredients were mixed, and a mixed solution was adjusted to pH 8.4 by acetic acid, and after agitation for two hours, was filtered through Floropore filter FP-100 (trade name, manufactured by Sumitomo Electric Industries) to obtain water-color inks I, J as presented in the following.

| Ink I: | | |
|---|---|---|
| | C.I. Acid Blue 40 | 4.0 parts |
| | Diethylene glycol | 36.6 parts |
| | Water | 60 parts |
| Ink J: | | |
| | C.I. Acid Black 26 | 6.0 parts |
| | Diethylene glycol | 36.0 parts |
| | Water | 58.0 parts |

Using the above inks, the recording was performed with the apparatus as shown in FIG. 15 under the following recording conditions (apparatus a).

Head: 400 dpi, 256 nozzles, orifice (22 $\mu$m×33 $\mu$m)

Drive voltage: 24.0 V

Head temperature: 25° C. to 60° C.

Drive pulse width: 10 $\mu$s

Drive frequency: 1.5 KHz to 4.0 KHz

Distance between nozzle and the cloths: 1 mm

Ink discharge amount: 20 pl to 50 pl/dot

Print length (length of one scan): 1.6 m

Further, the recording was also performed with an apparatus b having a print length of 310 mm, which is shorter than the apparatus a, under the same recording conditions as above.

For the printing, the following two kinds of cloths were used. The cloths a were immersed in 10% sodium hydroxide solution, and then dried. The cloths b were immersed in 15% urea solution, and then dried.

Cloths a: flat sheeting (cotton 100%)

Cloths b: habutae with 8 momen (silk 100%)

Using the above apparatuses a, b, the solid recording was performed onto the cloths a, b, with continuous 30 scans, using each ink of A to J.

The apparatus a was driven by $1.8 \times 10^4$ pulses per nozzle for one scan when in solid recording, while the apparatus b was driven by $4.0 \times 10^3$ pulses per nozzle for one scan when in solid recording. As a result of recording, the occurrence frequency of undischarges and the average length of undischarge were examined. Further, printed product was subjected to fixation through steaming treatment (104° C., 10 minutes), and thereafter, washing with neutral detergent and drying. Then, the blur of obtained colored matter was evaluated. Also, the head orifice face after the printing was observed. These results are shown in FIG. 16.

In the figure, the average length of undischarge marked with *1 can be obtained according to $\Sigma 1/n$ (cm), where 1 is the length of undischarge and n is the number of undischarges.

In the figure, an item "blur" marked with *2 was obtained by visually observing and determining irregular disorder arising in the linear portion of edge in the solid portion. The symbols as indicated in the item of blur signify that "○" is a state of no disorder, "Δ" is a state of little disorder, and "X" is a state of much disorder.

In the figure, an item "head orifice face" marked with *3 was obtained by observing the discharge ability and the head orifice face. The symbols as indicated in the item of head orifice face signify that "○" is a state where no ink droplets are attached on the orifice face, "Δ" is a state where some ink droplets are attached on the orifice face without problem, and "X" is a state where many ink droplets are attached on the orifice face, thus resulting in difficult discharge.

As a result of recording, colored matter with excellent coloration and without blur could be obtained as stable discharge was effected by performing the full color printing using the above-mentioned inks A to D and I, J.

With the printing method of the present invention as described above, in the ink jet printing having a long print length, the stable discharge without causing undischarge could be effected, and further a high density colored matter without blur could be obtained.

While in this embodiment, a textile printing apparatus using the ink jet system was exemplified, it will be understood that the present invention can be embodied not only in the ink jet system, but also in various printing systems. When the ink jet system is adopted, the present invention brings about excellent effects particularly in the print head or printing apparatus of the system of having means for generating the heat energy (e.g., electricity-heat converters or laser beam) as the energy for use in discharging the ink and causing a state change in the ink due to the heat energy, among the various ink jet printing systems. With such a system, the higher density and higher precision printing can be attained.

Its representative constitution and principle were previously described in the embodiments 1 and 2. Also, it will be appreciated that various forms of head, ink tank and recovery means adoptable in the ink jet system may be also applicable to the embodiments 1, 2.

Fourth Embodiment

Figure 17:
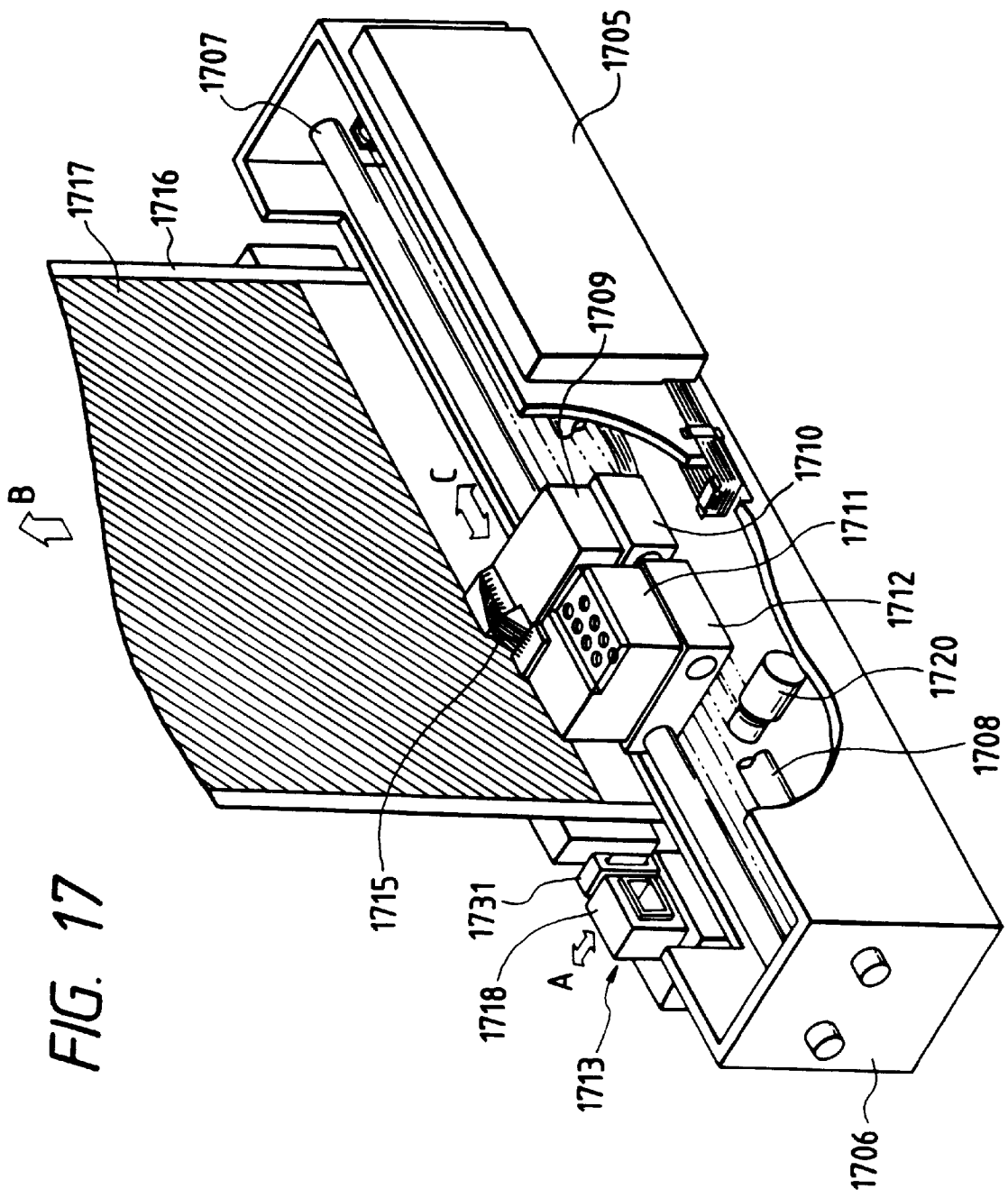
FIG. 17 is a perspective view showing the essential part of an ink jet recording apparatus according to the present invention.

A fourth embodiment of the present invention will be now described with reference to the drawings. FIG. 17 is a perspective view showing the constitution of an essential part (ink jet printing unit 170) of an ink jet recording apparatus in the embodiment of the present invention.

The ink jet printing unit 1701 performs the printing onto the lengthy extending cloths 1716, and is largely constituted of a frame 1706, an electrical system 1705 attached to the frame 1706, two guide rails 1707, 1708 attached to the frame 1706, a head holder 1709 for storing ink jet heads $221_1$ to $221_8$ as will be described later, a head carriage 1710 for the mounting of head holder 1709, an ink supply device 1711 for supplying the ink to each ink jet recording head, and an ink carriage 1712 for the mounting of ink supply device 1711. Also, an ink supply tube 1715 is provided to supply the ink from the ink supply device 1711 to each recording head.

The guide rails 1707, 1708 are parallel to each other, and extend in a width direction of the cloths 116. The head carriage 1710 and the ink carriage 1712 are carried on the guide rails 1707, 1708 for the free movement along a longitudinal direction of the guide rails 1707, 1708, i.e., over the entire width in the transverse direction of the cloths 1716. These carriages 1710, 1712 are integrally connected with each other in the normal operation, and reciprocated (scanned) in the width direction (direction of the arrow C as shown) of the cloths 1716 by a driving motor 1720. Also, the cloths 1716 are conveyed in the longitudinal direction or in the direction of the arrow B as shown by driving means, not shown. Within an electrical system 1705 are provided a power supply unit and a control unit for making the sequence control of the overall ink jet recording unit 1701.

One end of the scanning range of the ink carriage 1710 is set as a home position (waiting position) of the recording head. A head recovery device 1713 for effecting a recovery operation for the recording head at the home position is attached to the frame 1706. Recovery operation is an operation for maintaining ink discharge stability of the recording head, and specifically two operations are provided including capping the recording head to prevent the evaporation of the ink from the discharge orifices (nozzles) when not in operation (capping operation), and sucking and discharging the ink from the nozzles by pressurizing the ink flow channels within the nozzles before starting the image recording (suction recovery operation). The head recovery device 1713 has a capping unit 1718 which is movable forward and backward in the directions of the arrow A as shown. And the capping unit 1718 is moved forward to make capping of the recording head, and withdraw the ink discharged upon the suction recovery operation. To the head recovery device 1731 is attached a blade 1731 made of an elastic material such as rubber. The blade 1731 is provided to wipe out the nozzle face of the recording head to remove adhering ink droplets or dirt therefrom.

The ink supply device 1711 serves to reserve the ink, and supply a necessary amount of ink to the head, comprising ink tanks and an ink pump, which are not shown. An ink tank is provided for each recording head, as will be described later. Normally, the ink is supplied via the ink supply pipe 1715 from the ink tank to the recording head, owing to capillary action, by the same amount as discharged from the head. In the suction recovery operation of the recording head, the ink is compulsorily supplied to the recording head by using the ink pump within the ink supply device 1711.

Figure 18:
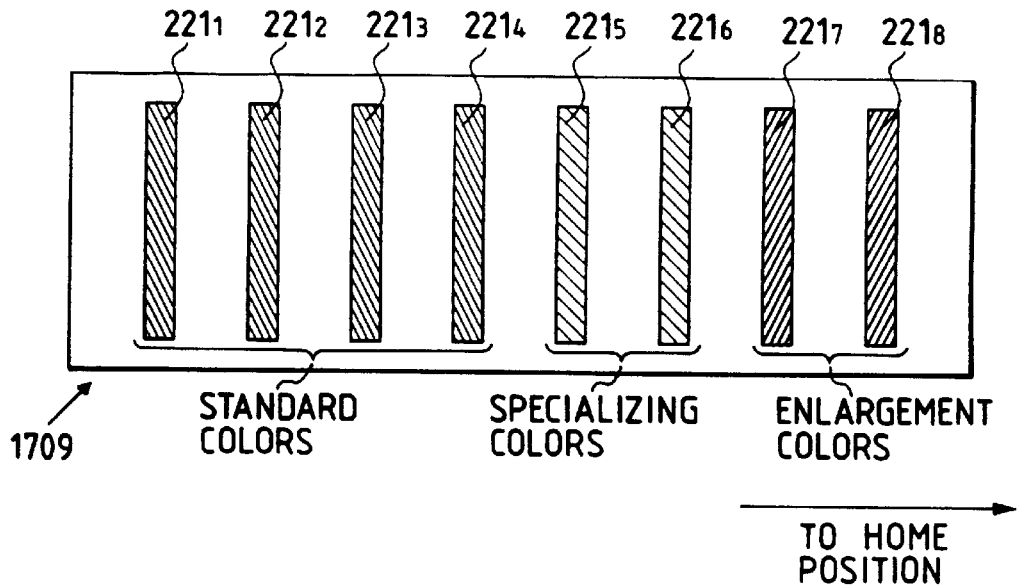
FIG. 18 is a front view showing the arrangement of recording heads.

Next, an ink jet recording head accommodated within the head holder 1709 will be described below. FIG. 18 is a view of the head holder 1709 as looked from the side of the cloths 1716.

The head holder 1709 has a total of eight recording heads $221_1$ to $221_8$ accommodated. Each recording head $221_1$ to $221_8$ has a plurality of nozzles for discharging the ink, which are disposed along the straight line parallel to the conveying direction of the cloths 1716 and opposed to the cloths 1716. Herein, a set of nozzles for each recording head $221_1$ to $221_8$ is referred to as a column of nozzles. In FIG. 18, eight columns of nozzles are shown for each of eight recording heads $221_1$ to $221_8$. Further, each recording head $221_1$ to $221_8$ has conversion elements for converting an input electrical signal into ink discharge energy, each conversion element corresponding to each discharge orifice (nozzle). Thereby, the ink is selectively discharged from the nozzle columns in accordance with an image signal sent from the image processing unit, not shown.

This recording head is preferably a head of discharging the ink by the use of the heat energy, comprising electricity-heat converters for applying the heat energy to the ink to cause a state change in the ink due to the heat energy applied to the ink and discharge the ink through the nozzles based on the state change.

The arrangement of recording heads $211_1$ to $221_8$ within the head holder 1709 will be described below. Eight recording heads $221_1$ to $221_8$ are arranged in one row in a scan direction of the head carriage 1710, that is, in the width direction of the cloths 1716. Herein, the first recording head $221_1$, the second recording head $221_2$, . . . , the eighth recording head $221_8$ are arranged in sequence from the side opposite to home position side.

Among the eight recording heads, the first to fourth, four recording heads $221_1$ to $221_4$ use standard color inks (four colors of cyan, magenta, yellow, black) for the recording. The first recording head $221_1$ corresponds to a cyan ink, the second recording head $221_2$ to a magenta ink, the third recording head $221_3$ to a yellow ink, and the fourth recording head $221_4$ to a black ink. The fifth and sixth recording heads $221_5$, $221_6$ use specializing color inks for the image formation, and the seventh and eighth recording heads $221_7$, $221_8$ use enlargement color inks for the image formation. An enlargement color ink is an ink for use in enhancing the image quality over the specializing color ink, for example, a light color ink. The light color ink is obtained, for example, by selecting a necessary ink dye from among the inks of standard colors and specializing colors, and reducing the density of dye.

Figure 19:
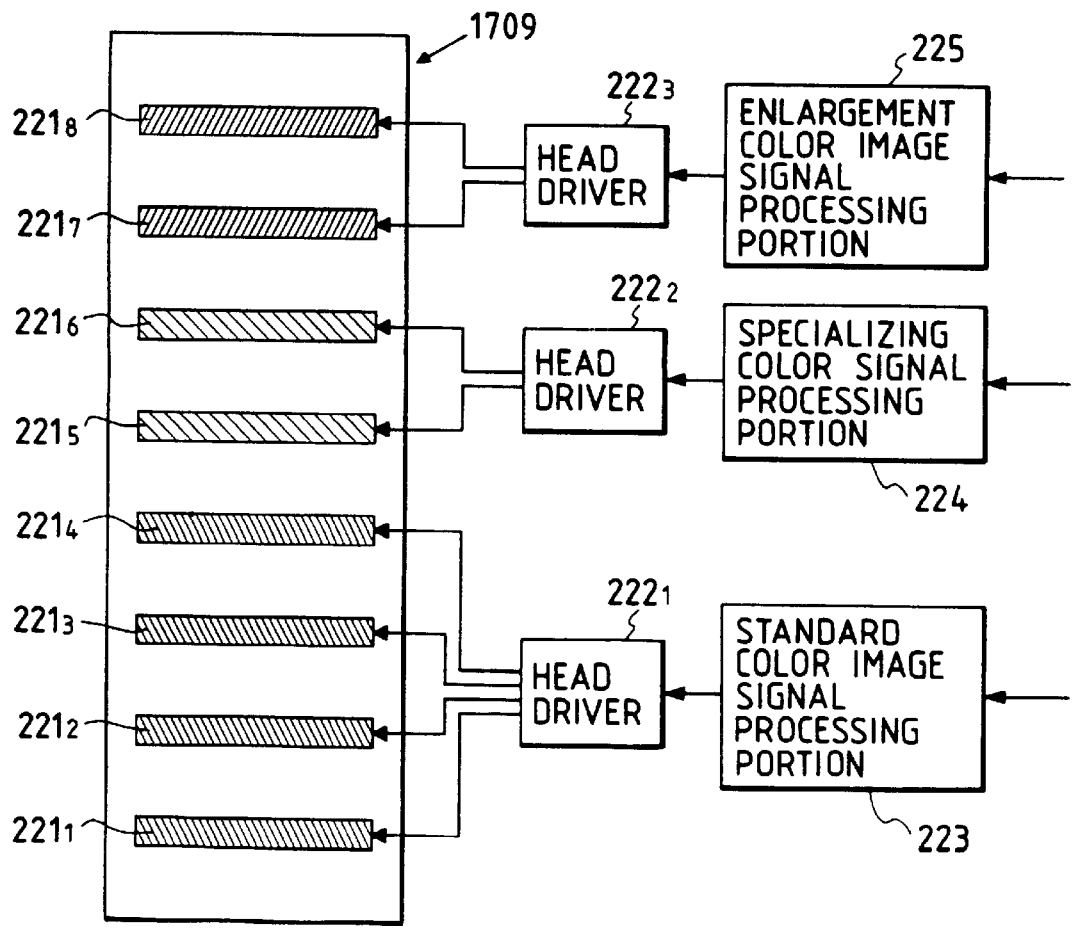
FIG. 19 is a block diagram showing the constitution of a drive system for the recording heads.

Next, a control system for each recording head $221_1$ to $221_8$ will be described below. As shown in FIG. 19, the recording heads $221_1$ to $221_8$ are classed into groups of standard colors, specializing colors, and enlargement colors, and driven by head drivers $221_1$ to $222_3$ for respective groups. A head driver $221_1$ for the recording heads $211_1$ to $221_4$ of standard color group is controlled by a standard color image signal processing portion 223, a head driver 222₂ for the recording heads 221₅, 221₆ of specializing color group is controlled by a specializing color image signal processing portion 224, and a head driver 222₃ for the recording heads 221₇, 221₈ of enlargement color group is controlled by an enlargement color image signal processing portion 225.

Next, the operation of this ink jet recording apparatus will be described below.

First, the cloths 1716 are held under a platen, not shown, and then mounted on the ink jet recording unit 1701 so that a predetermined recording start position on the cloths 1716 may face the head holder 1709. And the head carriage 1710 is one-way (two-way) scanned in a direction of the arrow C as shown, to cause each recording head 221₁ to 221₈ to discharge the ink in accordance with a recording signal during the scanning to form an image in a strip-like area on the cloths 1716. And the head carriage 1710 is moved in a return direction to return the head carriage 1710 to a position opposite the head recovery device 1711, which performs the recovery operation for each of the recording heads 221₁ to 221₈, then the cloths 1716 are moved one step (one recording width or nozzle columns length of recording head 221₁ to 221₈) in a direction of the arrow B as shown by the platen, and the head carriage 1710 is scanned reciprocally in the same way as above. By repeating the above operation, an image is completely formed on the cloths 1716.

After the ink jet recording process on the cloths is ended, the cloths 1716 is dried naturally or compulsorily, subsequently the dye on fibers of the cloths is diffused, and a reactive fixation process for fixing the dye onto the fibers is practiced. Through this process, sufficient coloration and fastness can be obtained. Thereafter, the cloths are washed as necessary. The diffusion and reactive fixation process may be conventionally well-known methods, for example, a steaming method. When the steaming method is used, it is necessary to subject the cloths 1716 to alkaline pretreatment, before performing the ink jet recording.

In the ink jet recording apparatus of this embodiment, eight recording heads 221₁ to 221₈ are provided, but all eight heads are not used depending on the image content or image quality obtained. For example, four recording heads 221₁ to 221₄ of standard colors are possibly only used. In this case, four recording heads 221₁ to 221₄ used are accommodated consecutively as one group within the head holder 1709, so that in the scan with the head carriage 1710, the scanning width (the movement amount of the head carriage 1710) can be determined in view of only these four recording heads 221₁ to 221₄. That is, when all the recording heads 221₁ to 221₈ are used, the movement amount of the head carriage 1710 is substantially equal to the sum of the width of the head carriage 1710 and the width of the cloths 1716, but if only the standard colors are used, the movement amount can be reduced by the amount corresponding to the four recording heads. Also, the recovery operation or the wiping operation with the blade 1731 can deal with only the recording heads 221₁ to 221₄ of standard colors.

Figure 20:
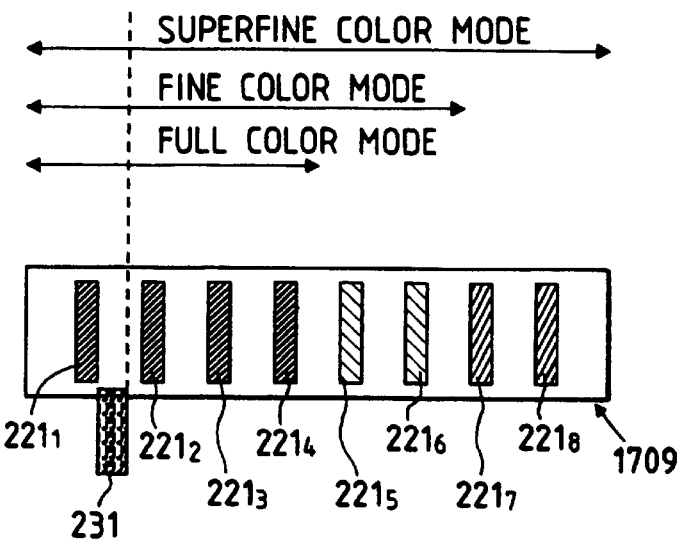
FIG. 20 is a view for explaining the wiping range with a blade.
Figure 21A:
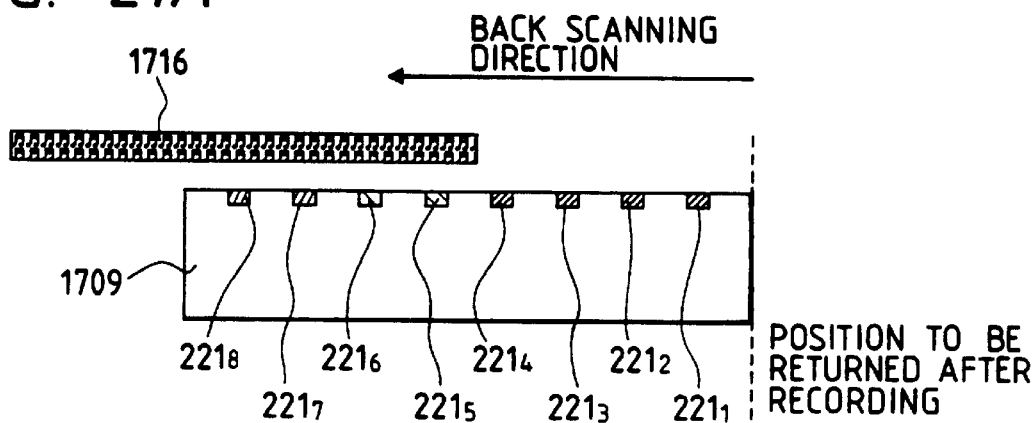
FIGS. 21A and 21B are views for explaining the movement range for a head holder.
Figure 21B:
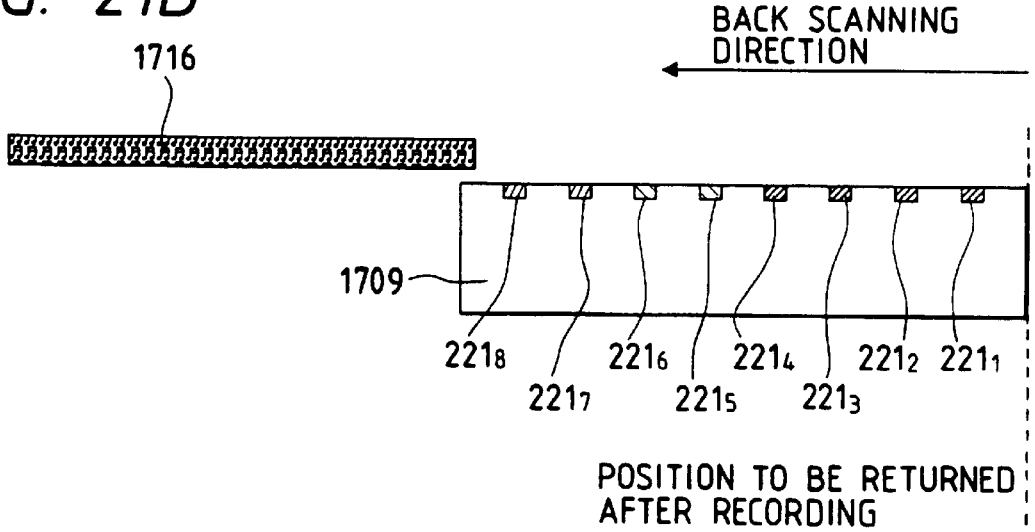

Providing that the mode for recording only with the standard colors is a full-color mode, the mode for recording with the standard colors and specializing colors is a fine color mode, and the mode for recording with the standard colors, specializing colors and enlargement colors is a super fine color mode, the wiping ranges with the blade 1731 are respectively indicated by the double-headed arrows in FIG. 20. Also, FIG. 21 is a typical view of the ink jet recording unit 1701 as looked from the above, showing the movement range of the head holder 1709 accompanying the movement of the head carriage 1710. In the full color mode, the central portion of the head holder 1709 is located at an end portion of the cloths 1716 when the scan is folded (returned), as shown in FIG. 21A. On the other hand, in the super fine color mode, substantially the whole head holder 1709 is located off the end of the cloths 1716.

In this way, by limiting the range of recording head to effect the recovery operation as necessary, one scan time is shorter so that the recording speed is substantially enhanced in the full color mode. Also, since no recovery operation or wiping operation is made for unused recording heads, unused recording heads are not subjected to rubbing with the blade or make no idle discharge, resulting in longer lives of recording heads.

Figure 22:
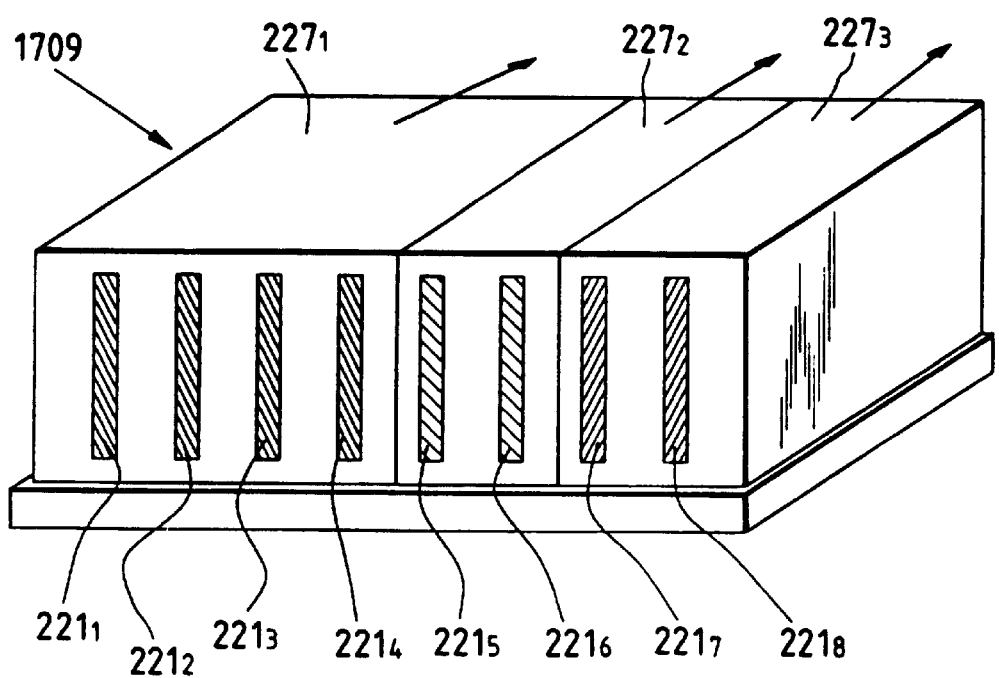
FIG. 22 is a typical view showing the constitution of a unit.

Also, in the apparatus of this embodiment, eight recording heads 221₁ to 221₈ are classed into the standard color group, the specializing color group and the enlargement color group. For each group, it is presumed that the use frequencies of recording heads in the group are substantially equal over the long term, and the life and replacement frequency of recording head is almost identical in each group. Thus, each group is formed as a unit, so that each of units 227₁ to 227₃ may be removed and replaced, as indicated by the arrow in FIG. 22, whereby the replacement operation of recording head can be facilitated. Also, the extension of the recording heads is allowed.

Further, as shown in FIG. 19, the color image processing system is divided into standard colors, specializing colors and enlargement colors, the image signal processing system can be unified, and thus simplified. With this unification, the extension for the use of more color inks can be easily made.

Next, the recording onto the cloths with the ink jet recording apparatus will be described in connection with the results practically conducted.

The recording head had heat energy converters for generating the heat energy applied to the ink. The shape of a nozzle was of a rectangle of 22 μm×33 μm, 256 nozzles per recording head being arranged at a density of 400 per inch (i.e., 400 dpi). The ink was discharged onto the cloths at an average discharge amount per nozzle of 45 pl to perform the recording. In this case, using recording heads for standard colors and specializing colors, namely, six recording heads 221₁ to 221₆, the full color recording was conducted. The composition of the ink used in each recording head 221₁ to 221₆ is as indicated in Table 1. Also, the cloths 1716 used were composed of a cotton fabric (lawn) in which raw yarn having an average diameter of 200 μm was plain woven.

TABLE 1

| Standard color/<br>specializing color | Standard color | | | | Specializing color | |
|---|---|---|---|---|---|---|
| Recording head number | (1) | (2) | (3) | (4) | (5) | (6) |
| Composition<br>(Reactive dye) | | | | | | |
| C.I. Reactive Blue 49 | 10 | — | — | — | — | — |
| C.I. Reactive Red 218 | — | 10 | — | — | — | — |
| C.I. Reactive Yellow 95 | — | — | 10 | — | — | — |
| C.I. Reactive Black 39 | — | — | — | 15 | — | — |
| C.I. Reactive Green 8 | — | — | — | — | 10 | — |
| C.I. Reactive Blue 15 | — | — | — | — | — | 10 |
| Thiodiglycol | 15 | 15 | 15 | 15 | 15 | 15 |
| Diethylene glycol | 15 | 15 | 15 | 15 | 15 | 15 |
| Water | 60 | 60 | 60 | 55 | 60 | 60 |

Thus, the recording in the full color mode and the fine color mode was allowed to perform as desired. By doing so, higher recording speed could be implemented with the image quality maintained high in the fine color mode when higher recording quality is required or in the full color mode when recording quality is not so high.

The present invention is also effective when variable density ink is used. Herein, in addition to standard colors (four colors) and specializing colors (two colors), two enlargement colors of light colors were used to enhance the reproducibility and the graininess of intermediate tone. Herein, light color inks with one-half dye density for cyan (number 1 in Table 1) and black (number 4 in Table 1) were applied to the recording heads 2217, 2218. And in addition to the full color mode and the fine color mode, the recording was enabled to perform in the super fine mode as desired.

The present invention brings about excellent effects particularly in a recording head or a recording device of the ink jet system for recording by forming liquid droplets by the use of the heat energy among the various ink jet recording systems.

Its representative constitution and principle were as previously described in the previous embodiments. Also, it will be appreciated that various forms of head, ink tank and recovery means adoptable in the ink jet recording system may be also applicable as in the previous embodiments.

Also, when the present invention is practiced as an ink jet textile printing apparatus, the cloths for textile printing, and the pretreatment and aftertreatment processes for the cloths can be the same as those described in the third embodiment.

As described above, the present invention has the effect of recording an excellent ink jet recording image with a wide color reproducibility and without defect at a sufficient speed, in such a way as to, with a plurality of recording heads held on head holding means, select recording heads used for the recording in accordance with a recording mode from among the plurality of recording heads, with selected recording heads arranged side by side consecutively. Also, the invention has the effect of allowing the longer life of recording head and the unification of electrical image processing system to be made, the reproduction costs and apparatus costs to be reduced, each recording head selected in accordance with the recording mode to be unified, and the replaceability of head to be enhanced.

Other Embodiment

The present invention has been described by exemplifying a textile printing apparatus using an ink jet recording system in the embodiments.

The cloths for ink jet textile printing are required to have the properties of:

(1) Coloration of ink at sufficient densities
(2) High dyeing rate of ink
(3) Ink rapidly drying on the cloths
(4) Less irregular blur of ink on the cloths
(5) Excellent conveyance within the apparatus To meet these requirements, the cloths may be pretreated as necessary in this invention. For example, in Japanese Laid-Open Patent Application No. 62-53492, several kinds of cloths having the ink receiving layer have been disclosed, and in Japanese Laid-Open Patent Publication No. 3-46589, the cloths containing a reduction inhibitor or alkaline substances have been proposed. The examples of such pretreatment may include treating the cloths to contain a substance selected from alkaline substance, water soluble polymer, synthetic polymer, water soluble metallic salt, urea, and thiourea.

The materials for the cloths to contain at the pretreatment are desirably those as described in the embodiment 3.

The method of pretreating the cloths to contain the above-cited substances is not specifically limited, but may be normally dipping, pad, coating, and spray methods.

Further, since the ink for textile printing applied to the cloths for ink jet textile printing is only attached onto the cloths in the state where the ink is jetted thereto, it is preferable to subsequently perform the fixation process of fixing a coloring matter, e.g., a dyestuff, in the ink onto fibers. Such fixation process may use conventionally well-known methods, including, for example, a steaming method, an HT steaming method, or a thermofix method, and if not using the cloths pretreated with alkali, an alkali pad steam method, an alkali blotch steam method, an alkali shock method, and an alkali cold fix method. Also, the fixation process may or may not involve the reaction process depending on the dyestuff, an example of the latter involving the use of the cloths impregnated with the dye not to be separated physically. Also, any appropriate ink can be employed as long as it has a desired coloring matter, wherein the ink can contain not only the dye but also pigment.

Further, the removal of unreacted dye and substances used in pretreatment can be made by washing in conformity with conventionally well-known methods after the reactive fixation process.

It should be noted that the printed products subjected to the aftertreatment process as above described are then cut out in desired size, cut pieces are subjected to the processes for providing the final articles such as stitching, bonding, and welding, to provide the clothings such as one-piece dresses, dresses, neckties or swimming suits, quilt covers, sofa covers, handkerchiefs, and curtains. The processing method of the cloths by stitching to provide the clothings or other daily needs may be conventionally well-known techniques.

Note that examples of the printing medium may include the cloths, wall cloths, embroidery threads, wall papers, papers and OHP films, and the cloths may include all woven or nonwoven fabrics and other cloths, irrespective of materials and how to weave or knit.

Also, an ink jet textile printing apparatus as shown in the embodiments 1, 2, 4 can be combined with an ink jet printing method in the embodiment 3, and such combination can give rise to further effects.

What is claimed is:

1. An image output apparatus, comprising:
   a plurality of print heads for effecting the printing of corresponding colors on the printing medium;
   a carriage on which said plurality of print heads are mountable;
   scanning means for scanning said carriage relative to the printing medium to form an image by means of said plurality of print heads;
   scan range changing means for changing a scan range by said scanning means in accordance with a print head for use in forming the image among said plurality of print heads mounted on said carriage;
   storage means for storing conversion data for representing print colors, provided respectively corresponding to said plurality of print heads;
   conversion data changing means for changing said conversion data stored in said storage means in accordance with the print head chosen for forming the image;
   input means for inputting image data;
   processing means for processing an image signal corresponding to said plurality of print heads from the image data in accordance with said conversion data; and
   print head driving means for driving said chosen print head in accordance with the image signal.

2. An image output apparatus according to claim 1, wherein said conversion data changing means changes said conversion data stored in said storage means in accordance with print heads mounted on said carriage.

3. An image output apparatus according to claim 2, wherein said conversion data changing means changes said conversion data stored in said storage means in accordance with print colors corresponding to the plurality of print heads mounted on said carriage and/or the number of print heads mounted on said carriage.

4. An image output apparatus according to claim 1, wherein said scan range changing means and/or said conversion data changing means change said scan range and/or said conversion data in accordance with print colors corresponding to the plurality of print heads mounted on said carriage, the number of print heads mounted on said carriage, and the positions of print heads mounted on said carriage.

5. An image output apparatus according to claim 1, further comprising head detecting means for detecting print heads mounted on said carriage.

6. An image output apparatus according to claim 5, wherein said head detecting means detects the presence or absence of print heads mounted on said carriage.

7. An image output apparatus according to claim 5, wherein said head detecting means detects the presence or absence of print heads mounted on said carriage and print colors corresponding to print heads mounted.

8. An image output apparatus according to claim 7, wherein said scan range changing means and/or said conversion data changing means change said scan range and/or said conversion data in accordance with print colors corresponding to the plurality of print heads mounted on said carriage, the number of print heads mounted on said carriage, and the positions of print heads mounted on said carriage.

9. An image output apparatus according to claim 1, wherein said print heads form an image on the print medium by discharging the ink onto said print medium.

10. An image output apparatus according to claim 9, further comprising:
    recovery means for maintaining the discharge condition of said ink excellent, print heads mounted on said carriage being movable to a position opposite said recovery means in the scan range of said carriage by said scanning means;
    wherein said scan range changing means changes the scan range of said carriage for said recovery means.

11. An image output apparatus according to claim 9, wherein said print head has a plurality of discharge means for discharging the ink, said plurality of discharge means discharging the ink in accordance with corresponding drive signals applied respectively.

12. An image output apparatus according to claim 11, wherein at least one of the plurality of discharge means contained in said print head can discharge the ink by the application of drive signals of $5 \times 10^3$ times or more during one scan of said carriage by said scanning means in a predetermined direction, and the ink contains a dye from 2 wt % to 30 wt % of all the ink, the viscosity of the ink being from 1.5 cp to 4 cp, and the surface tension of the ink being from 35 dyn/cm to 65 dyn/cm.

13. An image output apparatus according to claim 12, wherein the viscosity of the ink is from 2.0 cp to 3.8 cp.

14. An image output apparatus according to claim 12, wherein the surface tension of the ink is from 35 dyn/cm to 60 dyn/cm.

15. An image output apparatus according to claim 11, wherein said drive signals are of pulse shape.

16. An image output apparatus according to claim 1, wherein said carriage can be mounted with a plurality of standard color print heads for printing in standard colors and a plurality of specializing color print heads for printing in specializing colors.

17. An image output apparatus according to claim 16, wherein said standard colors are four colors of cyan, magenta, yellow and black.

18. An image output apparatus according to claim 17, wherein said carriage can be mounted with four print heads for specializing colors.

19. An image output apparatus according to claim 17, wherein at least one of said specializing color print heads can print in any one of said standard colors.

20. An image output apparatus according to claim 16, wherein said plurality of standard color print heads and said plurality of specializing color print heads are mounted on said carriage so that standard color print and specializing color print may not be alternately made.

21. An image output apparatus according to claim 16, wherein said plurality of print heads are mounted so that the printing order of corresponding colors may not be altered.

22. An image output apparatus according to claim 16, wherein said carriage can be mounted with a plurality of print heads corresponding to predetermined print colors.

23. An image output apparatus according to claim 22, wherein said plurality of print heads corresponding to said predetermined print colors are mounted one next to the other on said carriage.

24. An image output apparatus according to claim 1, wherein said print medium used comprises cloth.

25. An image output method for forming an image on a printing medium while scanning a carriage having a plurality of print heads mounted relative to the printing medium, comprising the steps of:
    detecting a print head mounted on said carriage;
    changing a scan range in accordance with the print head mounted on said carriage;
    changing conversion data for representing color tones corresponding to print colors in accordance with a detection in said print head detecting step and in accordance with the print head mounted on said carriage;
    inputting image data;
    processing an image signal corresponding to the plurality of print heads from the image data in accordance with the conversion data; and
    driving the mounted print head in accordance with the image signal.

26. An image output method according to claim 25, wherein said head detecting step includes the step of detecting print colors corresponding to print heads mounted on said carriage, the number of print heads mounted on said carriage, and the positions of print heads mounted on said carriage.

27. An image output method according to claim 25, wherein said print heads form an image on the printing medium by discharging the ink.

28. An image output method according to claim 27, wherein said print head is characterized by discharging the ink by causing a state change in the ink due to the heat and utilizing a pressure based on said state change.

29. An image output method according to claim 27, wherein at least one of print heads mounted on said carriage can discharge the ink as many as $5 \times 10^3$ times during one scan in which said carriage scans relatively over the printing medium in a predetermined direction, said ink containing a dye from 2 wt % to 30 wt % of all the ink, the viscosity of said ink being from 1.5 cp to 4 cp, and the surface tension of said ink being from 35 dyn/cm to 65 dyn/cm.

30. An image output method according to claim 29, wherein the viscosity of said ink is from 2.0 cp to 3.8 cp.

31. An image output method according to claim 29, wherein the surface tension of said ink is from 35 dyn/cm to 60 dyn/cm.

32. An image output method according to claim 27, further comprising the steps of:

performing a recovery processing for maintaining the discharge condition of said ink excellent at a position opposite which the print heads mounted on said carriage can be placed in the scan range of said carriage; and changing the scan range of said carriage in said recovery step in accordance with the print heads mounted on said carriage.

33. An image output method according to claim 27, further comprising the step of fixing the ink onto said printing medium upon making a printing by discharging the ink onto said printing medium.

34. An image output method according to claim 33, wherein said fixing step includes drying the ink discharged onto said printing medium with heat.

35. An image output method according to claim 33, further comprising the step of washing the printing medium after the printing after said step of fixing said ink.

36. An image output method according to claim 27, further comprising a pretreatment process of containing a pretreatment agent in said printing medium before the printing by discharging the ink from said print heads.

37. An image output method according to claim 27, wherein said printing medium comprises cloths.

38. An ink jet recording apparatus, using a plurality of recording heads for forming an image on the recording medium by discharging ink, for forming the image comprising a number of dots of the ink on the recording medium in such a way as to cause said recording heads to face the recording medium and scan in a main scan direction relative to the recording medium, said apparatus comprising:

head mounting means for mounting the plurality of said recording heads;

selecting means for selecting recording heads to be used for the recording in accordance with a recording mode from among said plurality of recording heads mounted on said head mounting means;

operation control means for effecting a desired operation only for the recording heads selected by said selecting means; and cleaning means for scraping and cleaning discharge orifice faces of said recording heads, wherein said recording heads selected are arranged along the main scan direction on said head mounting means consecutively for each recording mode, said operation control means changes a variable range of relative positions in the main scan direction in accordance with said selected recording heads, and said operation control means brings said cleaning means into contact with only said selected recording heads.

39. An ink jet recording apparatus according to claim 38, wherein the recording medium comprises cloth.

40. An ink jet recording apparatus according to claim 39, wherein the recording medium comprises woven fabrics.

41. An ink jet recording apparatus according to any one of claims 38, 39 and 40, wherein said recording head comprises an ink jet recording head for discharging the ink by the use of heat energy, and having heat energy converters for generating the heat energy applied to the ink.

42. An ink jet recording apparatus according to claim 41, wherein said recording head causes a state change in the ink due to the heat energy applied by said heat energy converters to discharge the ink through discharge orifices based on said state change.

43. An ink jet recording method, using a plurality of recording heads for forming an image on a recording medium by discharging ink, said recording heads being placed opposite the recording medium and scanned in a main scan direction to form the image on the recording medium, said method comprising the steps of:

arranging said plurality of recording heads along the main scan direction consecutively for each recording mode;

selecting recording heads to be used for the recording in accordance with a recording mode from among said plurality of recording heads in forming the image on the recording medium;

effecting a desired operation only for said recording heads selected;

changing a variable range of relative position in the main scan direction in accordance with said selected recording heads; and effecting scraping and cleaning by contacting cleaning means with discharge orifice faces of only said recording heads selected in said selecting step.

44. An ink jet recording method according to claim 43, wherein the recording medium comprises cloth.

45. An ink jet recording method according to claim 44, wherein said recording medium is the woven fabrics.

46. An ink jet recording method according to claim 43, wherein the recording medium comprises wall paper.

47. An ink let recording method according to any one of claims 43 and 44 to 46, further comprising a process of fixing the ink onto the recording medium after the recording by attaching the ink onto the recording medium.

48. An ink jet recording method according to claim 47, further comprising a process of washing the recording medium as recorded after said process of fixing the ink.

49. An ink jet recording method according to any one of claims 43 and 44 to 46, further comprising a pretreatment process of containing a pretreatment agent in the recording medium before the recording by discharging the ink from said recording heads.

50. An ink jet recording method according to any one of claims 43 and 44 to 46, wherein each of said recording heads comprises an ink jet recording head for discharging the ink by the use of heat energy, and having heat energy converters for generating the heat energy applied to the ink.

51. An ink jet recording method according to claim 50, wherein each of said recording heads causes a state change in the ink due to the heat energy applied by said heat energy converters to discharge the ink through discharge orifices based on said state change.

52. An image forming apparatus for effecting printing of a color image on a printing medium, said apparatus comprising:

a mounting portion on which a plurality of print heads are mountable, wherein print heads corresponding to yellow, magenta, cyan and black and plural other print heads are mountable on the mounting portion;

detecting means for detecting recording colors corresponding to said plurality of print heads to be mounted on said mounting portion and a number of print heads to be mounted on said mounting portion;

an image processing section for converting image data to driving data for driving said plurality of print heads, correspondingly to each of said plurality of print heads, said image processing section changing a process for converting the image data into the driving data in accordance with the recording colors corresponding to said plurality of print heads detected by said detecting means and the number of print heads to be mounted, wherein said image processing section processes conversion of the image data into the driving data such that the process in a case that the plural print heads mounted on the mounting portion correspond to four colors of yellow, magenta, cyan and black is different from that in a case that plural print heads corresponding to the four colors and a print head corresponding to another color are mounted; and head driving means for driving said plurality of print heads in accordance with the driving data to form a color image.

53. An apparatus according to claim 52, wherein said image processing section converts inputted image data into the driving data for driving said plurality of print heads by using converted data in accordance with the recording colors corresponding to said plurality of print heads detected by said detecting means and the number of print heads to be mounted.

54. An apparatus according to claim 53, wherein said image processing section changes the converted data in accordance with the recording colors corresponding to said plurality of print heads detected by said detecting means and the number of print heads to be mounted.

55. An apparatus according to claim 52, wherein said plurality of print heads forms an image by discharging ink onto the recording medium.

56. An apparatus according to claim 55, wherein each of said plurality of print heads comprises an electrothermal converting member for applying thermal energy to the ink and discharges the ink with the thermal energy generated by said electrothermal converting member.

57. An apparatus according to claim 55, further comprising means for fixing the ink onto the recording medium.

58. An apparatus according to claim 55, wherein the recording medium comprises cloth.

59. An apparatus according to claim 55, wherein the recording medium comprises wall paper.

60. An apparatus according to claim 52, wherein said detecting means detects the presence or absence of said print heads mounted on said mounting portion.

61. An apparatus according to claim 60, wherein said image processing section converts inputted image data into the driving data for driving said plurality of print heads by using converted data in accordance with the recording colors corresponding to said plurality of print heads detected by said detecting means and the number of print heads to be mounted.

62. An apparatus according to claim 61, wherein said image processing section changes the converted data in accordance with the recording colors corresponding to said print heads mounted on said mounting portion, the number of print heads mounted on said mounting portion, and positions of print heads mounted on said mounting portion.

63. A method for forming an image by using a plurality of print heads for effecting printing of corresponding colors on a recording medium, said method comprising the steps of:

detecting recording colors corresponding to the plurality of print heads to be mounted on a mounting portion on which a plurality of print heads are mountable and a number of print heads to be mounted on the mounting portion, wherein the print heads corresponding to yellow, magenta, cyan and black and plural other print heads are mountable on the mounting portion,;

inputting image data;

image processing by converting the inputted image data into driving data for driving the plurality of print heads, correspondingly to each of the plurality of print heads, wherein in said image processing step a process for converting the inputted image data into the driving data is changed in accordance with the recording colors corresponding to the plurality of print heads to be mounted on the mounting portion and the number of print heads to be mounted, wherein said image processing step processes conversion of the image data into the driving data such that the process in a case that the plural print heads mounted on the mounting portion correspond to four colors of yellow, magenta, cyan and black is different from that in a case that plural print heads corresponding to the four colors and a print head corresponding to another color are mounted; and driving the plurality of print heads in accordance with the driving data to form the image.

64. A method according to claim 63, wherein in said image processing step the inputted image data is converted into the driving data for driving the plurality of print heads by using converted data in accordance with the recording colors corresponding to the plurality of print heads to be mounted on the mounting portion and the number of print heads to be mounted.

65. A method according to claim 64, wherein in said image processing step the converted data is converted in accordance with the recording colors corresponding to the plurality of print heads to be mounted on the mounting portion and the number of print heads to be mounted.

66. A method according to claim 63, wherein the plurality of print heads forms an image by discharging ink onto the recording medium.

67. A method according to claim 66, wherein each of the plurality of print heads comprises an electrothermal converting member for applying thermal energy to the ink and discharges the ink with the thermal energy generated by the electrothermal converting member.

68. A method according to claim 66, further comprising a step of fixing the ink onto the recording medium.

69. A method according to claim 66, wherein the recording medium comprises cloth.

70. A method according to claim 66, wherein the recording medium comprises wall paper.

71. A method of producing printed products by using an image forming apparatus, said image forming apparatus using a print head for effecting printing of corresponding colors on a printing medium, and having a mounting portion on which a plurality of print heads are mountable, wherein print heads corresponding to yellow, magenta, cyan and black and plural other print heads are mountable on the mounting portion, said method comprising the steps of:

detecting a number of print heads mounted on the mounting portion and recording colors corresponding to the mounted print heads;

changing conversion data for representing color tones corresponding to print colors in accordance with a result of detection in said detecting step;

inputting image data;

processing an image signal corresponding to the plurality of print heads which are mounted on the mounting portion from the image data in accordance with the conversion data, wherein said processing step processes the image signal such that processing in a case that the plural print heads mounted on the mounting portion correspond to four colors of yellow, magenta, cyan and black is different from that in a case that plural print heads corresponding to the four colors and a print head corresponding to another color are mounted; and driving the mounted print heads in accordance with the processed image signal.

72. A method according to claim 71, further comprising the step of processing the printed products.

73. A method according to claim 72, wherein said processing step comprises cutting the printed products to a desired size, and further processing cut pieces of the printed products.

74. A method according to claim 73, wherein the printing medium comprises cloth, and said further processing comprises stitching.

75. A method according to claim 74, wherein the printed products comprise clothing.

* * * * *

UNITED STATES PATENT AND TRADEMARK OFFICE
CERTIFICATE OF CORRECTION

PATENT NO.   :  6,024,431

DATED        :  February 15, 2000

INVENTOR(S)  :  TAKAHASHI ET AL.                    Page 1 of 4

It is certified that error appears in the above-identified patent and that said Letters Patent is hereby corrected as shown below:

COLUMN 1:
  Line 33, "represent" should read --be represented--.
  Line 40, "can not" should read --cannot--.
  Line 66, "can not" should read --cannot--.

COLUMN 2:
  Line 2, "of" should read --method of--.
  Line 15, "the" should be deleted.
  Line 24, "of" should read --by--.

COLUMN 3:
  Line 49, "head." should read --the head.--.

COLUMN 5:
  Line 64, "said" should read --the--.
  Line 65, "said" should read --the--.

COLUMN 6:
  Line 7, "said" should read --the--.
  Line 15, "said" should read --the--.
  Line 63, "typically showing" should read --showing typical--.

COLUMN 7:
  Line 48, "is" should read --are--.
  Line 49, "a roll," should read --rolls,--.
  Line 52, "And the" should read --The--.

UNITED STATES PATENT AND TRADEMARK OFFICE
CERTIFICATE OF CORRECTION

PATENT NO. : 6,024,431

DATED : February 15, 2000

INVENTOR(S) : TAKAHASHI ET AL.

Page 2 of 4

It is certified that error appears in the above-identified patent and that said Letters Patent is hereby corrected as shown below:

COLUMN 12:
  Line 1, "the preventing" should read --preventing--.
  Line 20, "colors." should read --colors,--.
  Line 21, "For" should read --for--.

COLUMN 14:
  Line 25, "scanning" should read --by scanning--, and "surface by" should read --surface--.
  Line 43, "and Bk." should read --and BL.--.

COLUMN 17:
  Line 34, "such" should read --such as--.
  Line 47, "thioglycol" should read --thiodiglycol--.
  Line 59, "agent." should read --agent may be used.--.

COLUMN 18:
  Line 28, "can not" should read --cannot--.

COLUMN 19:
  Line 29, "In creating data," should read --Creating data comprises--.

COLUMN 23:
  Line 61, "make" should read --effect--.
  Line 64, "1731" (first occurrence) should read --1713--.

UNITED STATES PATENT AND TRADEMARK OFFICE
CERTIFICATE OF CORRECTION

PATENT NO. : 6,024,431

DATED : February 15, 2000

INVENTOR(S) : TAKAHASHI ET AL.

It is certified that error appears in the above-identified patent and that said Letters Patent is hereby corrected as shown below:

COLUMN 24:
  Line 13, "looked" should read --viewed--.
  Line 65, "$221_1$" should read --$222_1$--.
  Line 66, "$221_1$" should read --$222_1$--, and "$211_1$" should read --$221_1$--.

COLUMN 25:
  Line 28, "is dried" should read --are dried--.
  Line 63, "looked" should read --viewed--, and "the above" should read --above--.

COLUMN 26:
  Line 61, Table 1, --Note: The units are in weight parts (weight percent).-- should be inserted.

COLUMN 27:
  Line 8, "2217,2218." should read --$221_7$, $221_8$.--.

COLUMN 31:
  Line 30, "process" should read --step--.
  Line 34, "cloths." should read --cloth.--.

COLUMN 32:
  Line 31, "said" should read --the--, and "is the" should read --comprises--.
  Line 34, "let" should read --jet--.

UNITED STATES PATENT AND TRADEMARK OFFICE
CERTIFICATE OF CORRECTION

PATENT NO.    : 6,024,431

DATED         : February 15, 2000

INVENTOR(S) : TAKAHASHI ET AL.

It is certified that error appears in the above-identified patent and that said Letters Patent is hereby corrected as shown below:

COLUMN 34:
  Line 46, "66," should read --63,--.
  Line 48, "66," should read --63,--.

Signed and Sealed this

Twenty-fourth Day of April, 2001

*Attest:*

NICHOLAS P. GODICI

*Attesting Officer*      *Acting Director of the United States Patent and Trademark Office*